United States Patent
Kaur et al.

(10) Patent No.: US 10,051,624 B2
(45) Date of Patent: Aug. 14, 2018

(54) WIRELESS OPERATION IN LICENSE EXEMPT SPECTRUM

(75) Inventors: Samian Kaur, Plymouth Meeting, PA (US); Erdem Bala, Farmingdale, NY (US); Tao Deng, Roslyn, NY (US); Kandarp Shah, Sunnyvale, CA (US); Kiran K. Vanganuru, King of Prussia, PA (US); Philip J. Pietraski, Huntington Station, NY (US); Stephen E. Terry, Northport, NY (US); Rui Yang, Greenlawn, NY (US); Gregory S. Sternberg, Mt. Laurel, NJ (US); Douglas R. Castor, Norristown, PA (US); Ravikumar V. Pragada, Collegeville, PA (US); Mihaela C. Beluri, Jericho, NY (US); Janet A. Stern-Berkowitz, Little Neck, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 453 days.

(21) Appl. No.: 13/991,871

(22) PCT Filed: Dec. 6, 2011

(86) PCT No.: PCT/US2011/063412
§ 371 (c)(1),
(2), (4) Date: Feb. 10, 2014

(87) PCT Pub. No.: WO2012/078565
PCT Pub. Date: Jun. 14, 2012

(65) Prior Publication Data
US 2015/0131536 A1 May 14, 2015

Related U.S. Application Data

(60) Provisional application No. 61/420,257, filed on Dec. 6, 2010.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04L 5/0053* (2013.01);
(Continued)

(58) Field of Classification Search
CPC ............. H04L 27/0006; H04L 27/2657; H04L 27/2662; H04L 5/001; H04L 5/005;
(Continued)

(56) References Cited

U.S. PATENT DOCUMENTS

| 7,769,383 B2 | 8/2010 | Deshpande et al. |
| 8,488,477 B2 | 7/2013 | Li et al. |

(Continued)

FOREIGN PATENT DOCUMENTS

| CN | 101883417 A | 11/2010 |
| EP | 2582170 A1 | 10/2010 |

(Continued)

OTHER PUBLICATIONS

ETSI ,"LTE; Evolved Universal Terrestrial Radio Access (E-UTRA); Physical layer procedures (3GPP TS 36.213 version 9.0.1 Release 9)", Jan. 2010, ETSI, ETSI TS 136 213 V9.0.1 (Jan. 2010), pp. 38-42.*

(Continued)

*Primary Examiner* — Un C Cho
*Assistant Examiner* — Shah Rahman
(74) *Attorney, Agent, or Firm* — Volpe and Koenig, P.C.

(57) ABSTRACT

A grant that includes a resource allocation for a subframe set may be communicated. The subframe set may include a subframe resource and another subframe resource following the subframe resource. Sensing, during a sensing time prior (Continued)

to utilization of the subframe resource, that the unlicensed spectrum is available may be performed. Transmitting, based on the sensing, data on the subframe resource and the another subframe resource without further sensing may also be performed.

7 Claims, 15 Drawing Sheets

(51) Int. Cl.
*H04L 27/00* (2006.01)
*H04L 27/26* (2006.01)

(52) U.S. Cl.
CPC ........ *H04L 5/0055* (2013.01); *H04L 27/0006* (2013.01); *H04W 72/0413* (2013.01); *H04L 5/005* (2013.01); *H04L 27/2657* (2013.01); *H04L 27/2662* (2013.01)

(58) Field of Classification Search
CPC ............... H04L 5/0053; H04L 5/0055; H04W 72/0413; H04W 72/0453; H04W 72/14
USPC ......................................................... 370/329
See application file for complete search history.

(56) References Cited

U.S. PATENT DOCUMENTS

| | | | | |
|---|---|---|---|---|
| 9,301,301 | B2* | 3/2016 | Aumann | H04W 16/02 |
| 9,819,403 | B2* | 11/2017 | Forenza | H04B 7/01 |
| 2004/0203815 | A1* | 10/2004 | Shoemake | H04W 72/02 |
| | | | | 455/450 |
| 2005/0025265 | A1* | 2/2005 | D'Amico | H04W 16/14 |
| | | | | 375/346 |
| 2007/0021127 | A1 | 1/2007 | Zheng | |
| 2008/0220787 | A1 | 9/2008 | Stanwood et al. | |
| 2008/0220788 | A1* | 9/2008 | Stanwood | H04L 5/0007 |
| | | | | 455/450 |
| 2009/0067448 | A1* | 3/2009 | Stanwood | H04L 12/413 |
| | | | | 370/447 |
| 2010/0034303 | A1* | 2/2010 | Damnjanovic | H04L 5/003 |
| | | | | 375/260 |
| 2010/0216478 | A1* | 8/2010 | Buddhikot | H04W 16/14 |
| | | | | 455/450 |
| 2010/0246506 | A1* | 9/2010 | Krishnaswamy | H04W 72/085 |
| | | | | 370/329 |
| 2010/0254392 | A1* | 10/2010 | Katar | H04L 12/1868 |
| | | | | 370/400 |
| 2011/0076962 | A1* | 3/2011 | Chen | H04L 5/001 |
| | | | | 455/68 |
| 2011/0105050 | A1* | 5/2011 | Khandekar | H04L 5/001 |
| | | | | 455/68 |
| 2011/0287794 | A1* | 11/2011 | Koskela | H04W 28/08 |
| | | | | 455/509 |
| 2012/0039180 | A1* | 2/2012 | Kim | H04L 5/0053 |
| | | | | 370/241 |
| 2012/0039284 | A1* | 2/2012 | Barbieri | H04W 48/10 |
| | | | | 370/329 |
| 2012/0063302 | A1* | 3/2012 | Damnjanovic | H04W 74/0833 |
| | | | | 370/228 |
| 2012/0077510 | A1* | 3/2012 | Chen | H04W 28/26 |
| | | | | 455/452.1 |
| 2012/0213196 | A1* | 8/2012 | Chung | H04B 1/713 |
| | | | | 370/330 |
| 2012/0307748 | A1* | 12/2012 | Cheng | H04L 5/0005 |
| | | | | 370/329 |
| 2013/0083766 | A1* | 4/2013 | Chung | H04W 72/0413 |
| | | | | 370/329 |
| 2013/0188552 | A1* | 7/2013 | Kazmi | H04L 5/001 |
| | | | | 370/315 |
| 2013/0265961 | A1* | 10/2013 | Van Phan | H04W 4/00 |
| | | | | 370/329 |
| 2013/0294356 | A1 | 11/2013 | Bala et al. | |
| 2013/0294415 | A1* | 11/2013 | Moilanen | H04W 16/14 |
| | | | | 370/331 |

FOREIGN PATENT DOCUMENTS

| | | | |
|---|---|---|---|
| GB | 2477649 A | 8/2011 | |
| WO | 06030056 A1 | 3/2006 | |
| WO | 07140722 A1 | 12/2007 | |
| WO | 2010094482 A1 | 8/2010 | |
| WO | 2010/111150 A2 | 9/2010 | |
| WO | WO 2011124259 A1 * | 10/2011 | ........... H04L 5/0007 |
| WO | 2011/144803 A1 | 11/2011 | |
| WO | WO 2011135392 A1 * | 11/2011 | ............. H04L 5/001 |

OTHER PUBLICATIONS

Mueck et al., "Opportunistic Relaying for Cognitive Radio Enhanced Cellular Networks: Infrastructure and Initial Results", May 2010, IEEE, 2010 5th International Symposium on Wireless Pervasive Computing (ISWPC), page: all.*
Choi et al., "IEEE 802.11e Contention-Based Channel Access (EDCF) Performance Evaluation", May 2003, IEEE, Proceedings of the IEEE ICC May 2003, pp. 1151-1156.*
Alcatel-Lucent et al., "Way Forward on PDCCH for Bandwidth Extension in LTE-A," 3GPP TSG RAN WG1 Meeting #58, R1-093699, Shenzhen, China (Aug. 24-28, 2009).
Feng et al, "Preamble Design for Non-contiguous Spectrum Usage in Cognitive Radio Networks," Hisilicon Technologies, China and University of California, Santa Barbara, USA (2009).
IEEE Standard for Information Technology—Telecommunicatoins and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).
MCC Support, "TSG RAN WG1 #Draft Report of 3GPP 59 v0.2.0 (Jeju, South Korea, Nov. 9-13, 2009)," 3GPP TSG RAN WG1 Meeting #59bis, R1-10xxx, Valencia, Spain (Jan. 18022, 2010).
Motorola, "Extension carrier operation," 3GPP TSG RAN WG1 Meeting #58bis, R1-093973, Miyazaki, Japan (Oct. 12-16, 2009).
NEC Group, "On component carrier types and support for LTE-A features," 3GPP TSG-RAN WG1 Meeting #56, R1-090646, Athens, Greece (Feb. 9-13, 2009).
Nokia et al., "On the need of extension carriers," 3GPP TSG-RAN WG1 Meeting #59bis, R1-100313, Valencia, Spain (Jan. 18-22, 2010).
Third Generation Partnership Project, "Technical Specification Group Radio Access Network; Evolved Universal Terrestrial Radio Access (E-UTRA); Further advancements for E-UTRA physical layer aspects (Release 9)," 3GPP TR 36.814 V9.0.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.5.0 (Sep. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.8.0 (Sep. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.10 (Sep. 2010).

(56) References Cited

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.5.0 (Sep. 2011).

TSG-RAN WG4, "Reply LS on RAN2 status on carrier aggregation," 3GPP TSG RAN WG4 Meeting #51bis, R4-09xxxx, Los Angeles, USA (Jun. 29-Jul. 2, 2009).

ZTE, "Carrier types for bandwidth extension," 3GPP TSG-RAN WG1 meeting #58bis, R1-093822, Miyazaki, Japan (Oct. 12-16, 2009).

Third Generation Partnership Project, "Technical Specification Group Radio Access Network; Evolved Universal Terrestrial Radio Access (E-UTRA); Add 2 GHz band LTE for ATC of MSS in North America Work Item Technical Report," 3GPP TR 36.811 V1.0.0 (Sep. 2010).

Third Generation Partnership Project, "Technical Specification Group Radio Access Network; Evolved Universal Terrestrial Radio Access (E-UTRA); Adding 2 GHz band LTE Frequency Division Duplex (FDD) (Band 23) for Ancillary Terrestrial Component (ATC) of Mobile Satellite Services (MSS) in North America (Release 10)," 3GPP TR 36.811 V10.0.0 (Jul. 2011).

Third Generation Partnership Project, "Technical Specification Group Radio Access Network; Physical Channels and Modulation (Release 8)," 3GPP TS 36.211 V1.0.0 (Mar. 2007).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.3.0 (Sep. 2011).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.3.0 (Sep. 2011).

Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.3.0 (Sep. 2011).

\* cited by examiner

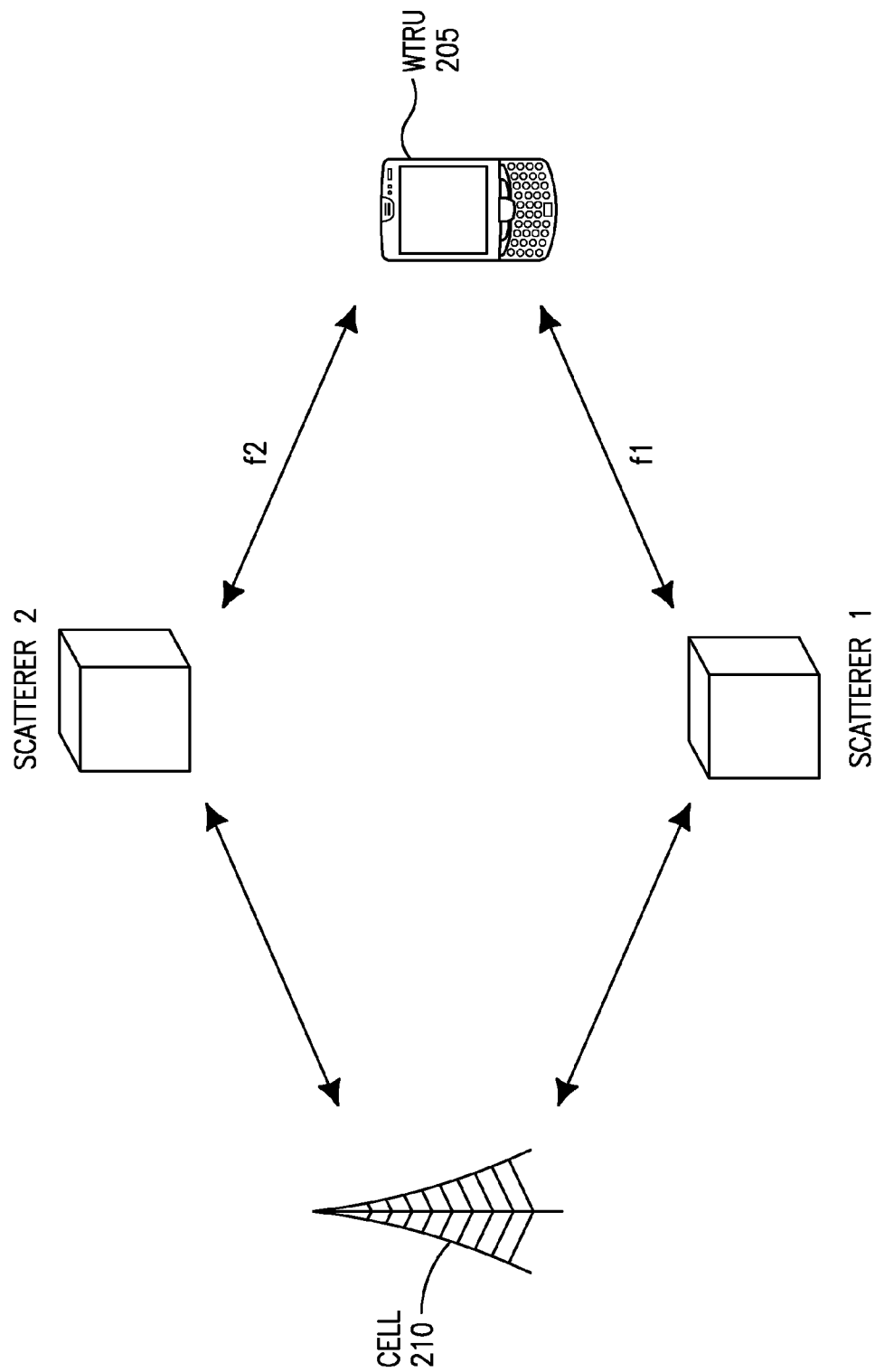

WIRELESS OPERATION IN LICENSE EXEMPT SPECTRUM

CROSS REFERENCE TO RELATED APPLICATIONS

This application claims the benefit of U.S. provisional application No. 61/420,257, filed Dec. 6, 2010, and PCT Application No. PCT/US2011/063412, filed Dec. 6, 2011, the contents of which are hereby incorporated by reference.

FIELD OF INVENTION

This application is related to wireless communications.

BACKGROUND

The Federal Communications Commission (FCC) originally conceived license exempt bands to provide a no-cost slice of public access spectrum with only two provisions. First, the transmitter may cause no harmful interference to any nearby licensed services, and secondly, any receiver in this band must be able to accept any interference that may be present. An example of license exempt bands may be industrial, scientific and medical (ISM) radio bands, which were reserved for the use of the wireless spectrum for USM purposes other than communications. The allocation of the ISM bands may differ in each nationality based on different regulations. Another example may be the Unlicensed National Information Infrastructure (UNII) spectrum, which may be used by Institute of Electrical and Electronics Engineers (IEEE) 802.11a devices and by many wireless Internet service providers (ISPs). The term license exempt may be used to refer to unlicensed and lightly licensed spectrum.

In the United States, 408 MHz of spectrum from 54 MHz to 806 MHz may be allocated for television (TV). A portion of that spectrum may be redeveloped for commercial operations through auctions and for public safety applications. The remaining portion of the spectrum may remain dedicated for over-the-air TV operations. However, throughout the United States, portions of that spectrum resource may remain unused. The amount and exact frequency of unused spectrum may vary from location to location. These unused portions of spectrum may be referred to as TV White Space (TVWS).

The FCC devised the TVWS with a slightly different set of regulations, which cannot be equated to either unlicensed or license exempt. These lightly licensed regulations are imposed on a major portion of the TVWS spectrum and require the primary users to purchase a license, which provides them first rights to transmit in the band. No one is allowed to interfere while a primary user is operating, but once the existing primary user is off the air, any other primary user with a license may begin to use the channel. Thus, a primary user gets exclusive licensed use of a channel for a period of time. During this time it needs to be registered with a centralized database, whose entries are mapped on a geographical basis. If no primary user is registered with the database, secondary users may access the spectrum in an unlicensed manner.

Wireless telecommunication equipment operates on licensed bands to communicate with cellular networks. As the demand for additional spectrum is constantly on the rise, it is would be beneficial to enable users to seamlessly and opportunistically roam across various wireless access networks in the search for more throughput or cheaper bandwidth. Secondary utilization of unused spectrum, be it unlicensed, lightly licensed, or licensed, requires efficient detection and sharing without harmful interference with other users. Methods are therefore needed to enable wireless telecommunication equipment to communicate via license exempt bands as well as licensed bands.

SUMMARY

Described herein are methods to enable wireless cellular operation in unlicensed and lightly licensed, (collectively referred to as license exempt spectrum. Cognitive methods are used to enable use of unlicensed bands and/or secondary use of lightly licensed bands. Wireless devices may use licensed exempt spectrum as new bands in addition to the existing bands to transmit to a wireless transmit/receive unit (WTRU) in the downlink direction, or to a base station in the uplink direction. The wireless devices may access license exempt spectrum for bandwidth aggregation or relaying using a carrier aggregation framework. In particular, a primary component carrier operating in a licensed spectrum is used for control and connection establishment and a second component carrier operating in a licensed exempt spectrum is used for bandwidth extension.

BRIEF DESCRIPTION OF THE DRAWINGS

A more detailed understanding may be had from the following description, given by way of example in conjunction with the accompanying drawings wherein:

FIG. 2 shows non-contiguous component carriers;

DETAILED DESCRIPTION OF THE EMBODIMENTS

Described herein are example communication systems that may be applicable and may be used with the description herein below. Other communication systems may also be used.

Figure 1A:
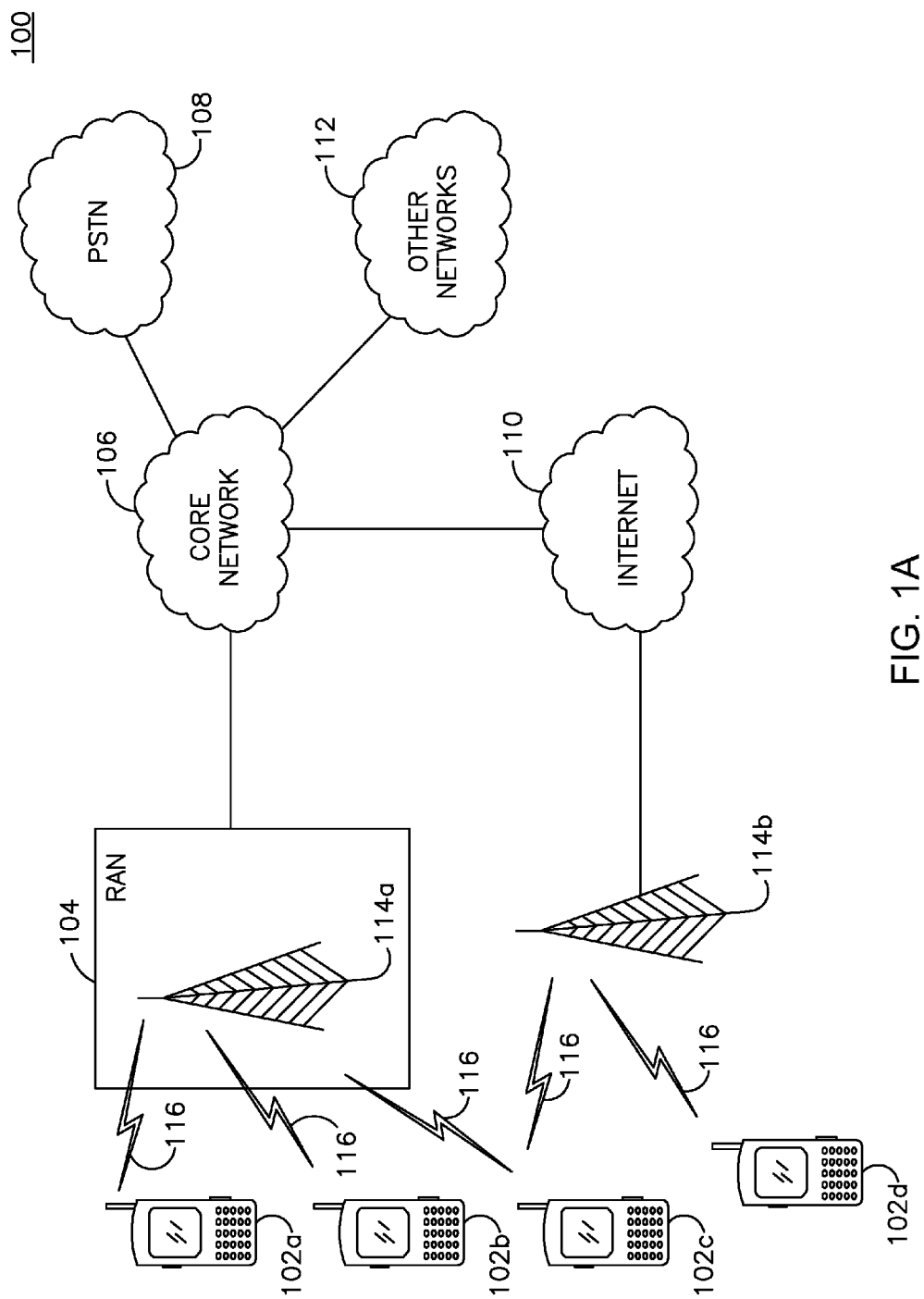
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
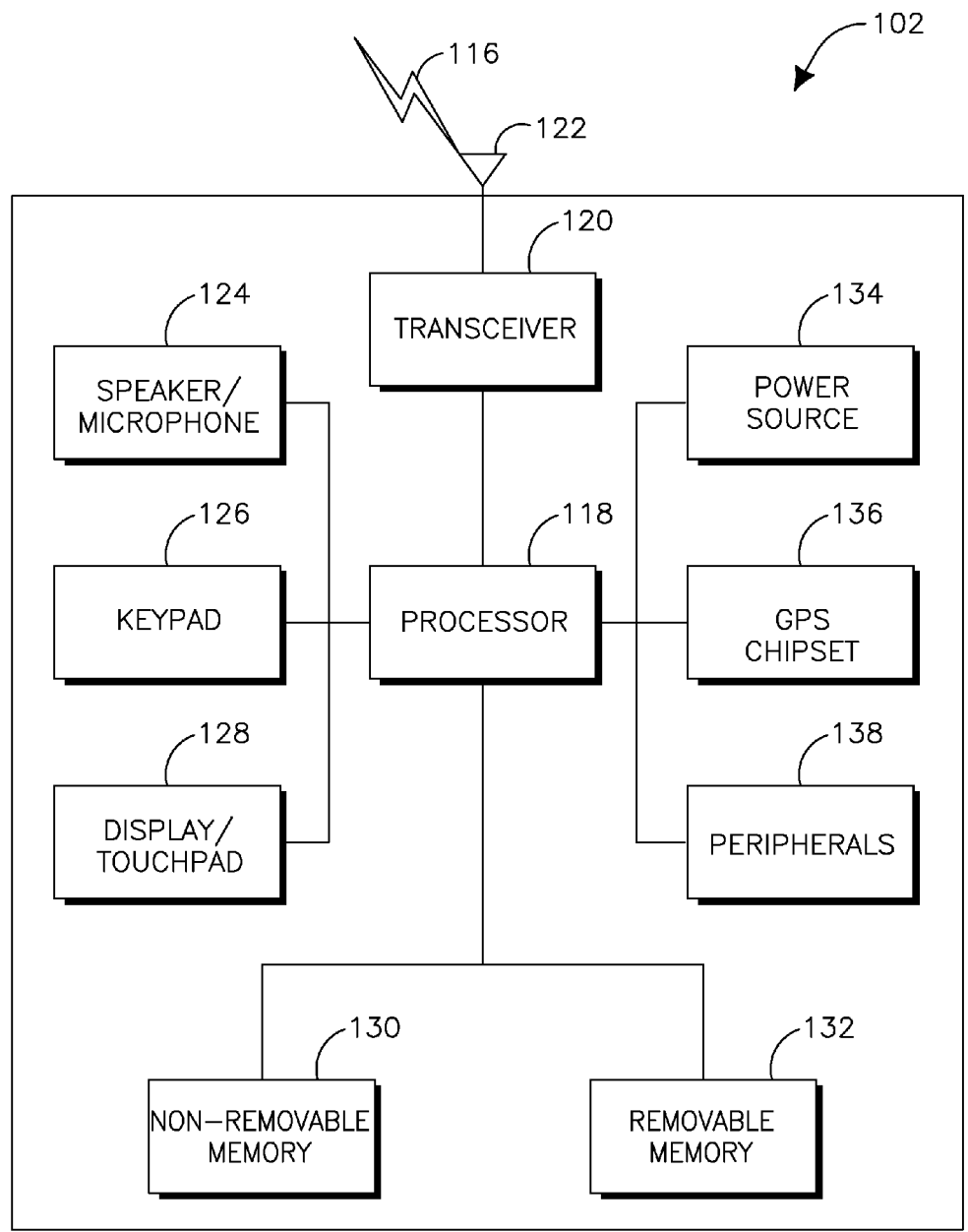
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
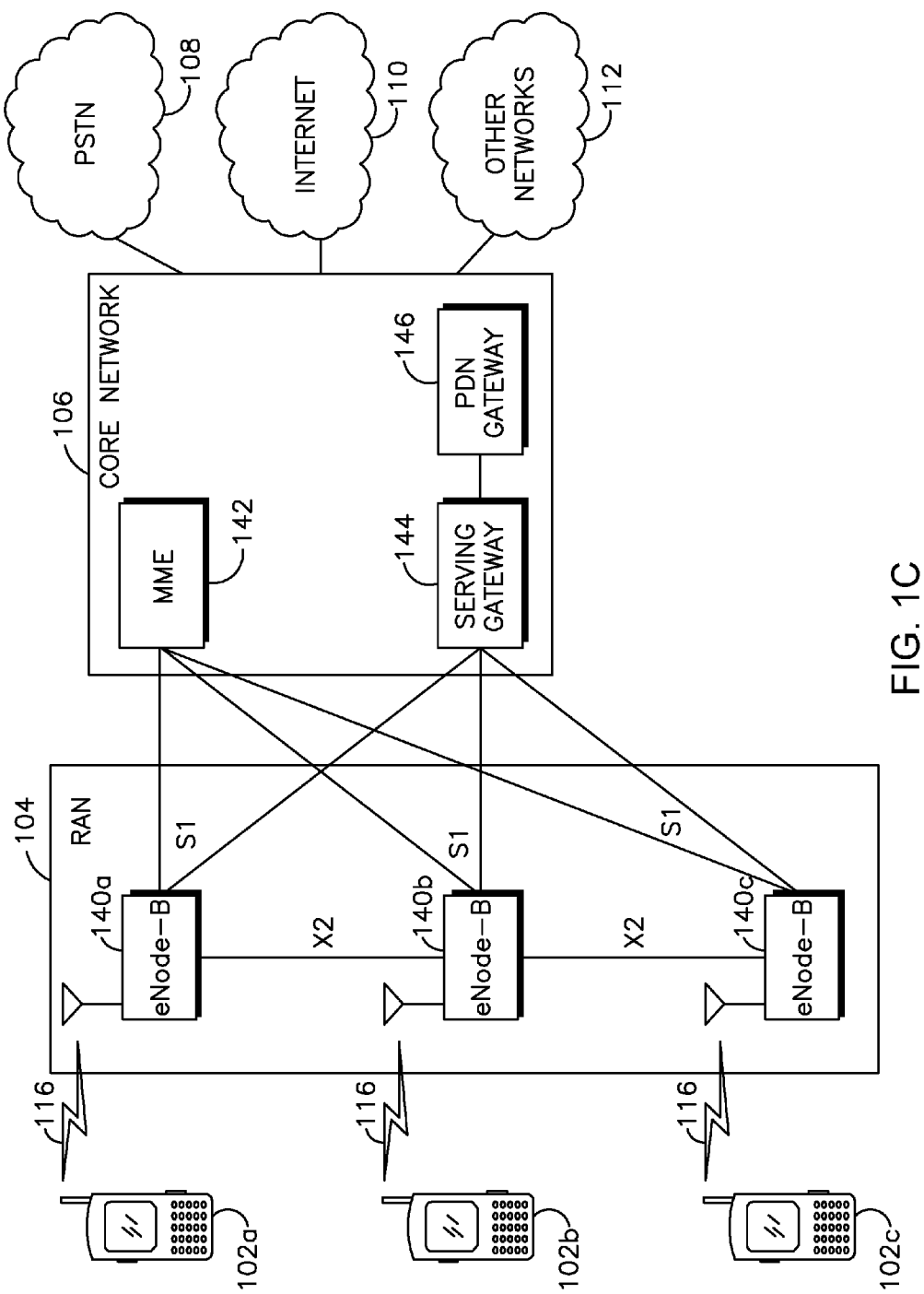
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Described herein are methods to enable wireless operation in lightly licensed and unlicensed spectrum, which is collectively referred to as license exempt spectrum herein. Cognitive methods are used to enable use of unlicensed bands and/or secondary use of lightly licensed bands. Wireless devices may use licensed exempt spectrum as new bands in addition to the existing bands to transmit to a wireless transmit/receive unit (WTRU) in the downlink direction, or to a base station in the uplink direction. The additional bandwidth may include an unlicensed band, lightly licensed or a licensed band used by another primary communication system. The wireless devices may access license exempt spectrum for bandwidth aggregation or relaying using a carrier aggregation framework.

Described herein are modifications with respect to existing physical, medium access control (MAC) and higher layer operations to enable usage of license exempt spectrum. To enable opportunistic use of license exempt spectrum such as industrial, scientific and medical (ISM)/Unlicensed National Information Infrastructure (UNIT) spectrum by cellular operated devices may require coexistence with Institute of Electrical and Electronics Engineers (IEEE) 802.11 Wi-Fi devices. Table 1 shows Federal Communications Commission (FCC) regulations on ISM and UNII bands that mandate avoiding "harmful interference" with licensed operators in the band of operation. A method for avoiding harmful interference is to allow "listen-before-talk" or "sensing before transmission".

TABLE 1

| ISM | UNII |
|---|---|
| Max Tx Pwr = 30 dBm (1 W) | Similar restrictions as in ISM |
| Max Eff. Isotropic Radiated Power (EIRP) = 36 dBm (4 W) | Dynamic frequency selection is mandated in some bands |
| Harmful interference is not allowed | |
| No leakage to the neighbor bands | |

In Carrier Sense Multiple Access (CSMA), a station wishing to transmit may first listen to the channel for a predetermined amount of time so as to check for any activity on the channel. If the channel is sensed "idle" then the station is permitted to transmit. If the channel is sensed as "busy" the station may defer its transmission. However, some cellular protocols assume scheduled spectrum access, and rely on grants to derive permission to access spectrum. Thus, if a dual-radio device using Long Term Evolution (LTE) protocols begins to use license exempt spectrum, it might cause unfair pre-emption and collisions of the Wi-Fi devices and performance degradation of these devices.

Synchronization plays an important role in orthogonal frequency-division multiplexing (OFDM) based LTE systems as this modulation technique may be sensitive to phase noise, frequency offset and timing errors. Timing and Frequency synchronization is required between the base station, (including relay nodes), and the WTRU transceivers for the reception of OFDM signals. In considering a license exempt spectrum for LTE OFDM usage, timing and frequency synchronization may be enabled to allow reception of LTE OFDM symbols on the license exempt bands.

In carrier aggregation, initial timing acquisition may be considered to be achieved using the primary component carrier's primary shared channel (SCH) and secondary SCH. Thereafter, for continuous tracking of the timing-offset, two classes of approaches exist, based on either cyclic prefix (CP) correlation or reference signals (RSs). In some embodiments, no synchronization symbols are sent on an extension carrier and common reference signal (CRS) may be used for continuous timing/frequency tracking. An extension carrier may be a carrier that may not be operated as a single carrier (stand-alone), but may need to be part of a component carrier set where at least one of the carriers in the set is a stand-alone capable carrier.

Since channel accessing and channel occupation for the license exempt channel may depend on the availability of the channel, the synchronization techniques for licensed carrier aggregation may not be applicable for the new system. For instance, it may not be possible to assume continuous transmission of CRS symbols to allow continuous timing/frequency tracking on license exempt bands.

For initial timing synchronization, in the scenario of where carrier aggregation is performed across a licensed band of LTE Band (1 at 2 GHz) and an unlicensed band in 5 GHz, using different transmitter chains, it may be impractical to assume that initial timing may be acquired from the primary component carrier since widely separated bands may have different propagation environments.

FIG. 2 shows the scenario of a WTRU 205 receiving two component carriers (CCs) on different bands, $f_1$ and $f_2$, from a base station/cell 210. The different component carriers may see different propagation environments, (due to diffraction caused by an obstruction (i.e., scatterer 1 and scatterer 2), different paths traveled due to presence of a directional repeater and the like, and see different time-of-flights.

The timing start alignment is from the First Significant Path (FSP) detection, i.e., the downlink frame timing is aligned with the FSP. But, the FSP locations of two CCs may depend on the delay spread the two CCs experience when arriving at the WTRU. For carrier aggregation across component carriers separated by a large band, for example, frequency bands 700/800/900 MHz with 5 GHz, using the FSP on the primary CC may not be sufficient.

Further the range of license-exempt bands operation may be restricted due to maximum transmitter power restrictions (FCC) on the license-exempt bands. In one embodiment, separate timing advance commands per component carrier may be allowed.

In carrier aggregation, initial frequency acquisition is considered to be achieved using a primary component carrier's primary SCH and secondary SCH. However, for the new license exempt bands, additional varying Doppler shifts in the aggregated carrier set may be across component carriers separated by a large band, for example, 700/800/900 MHz with 5 GHz. Some embodiments may assume use of CRS on the extension carrier.

LTE communication may use regular and periodic transmissions of Physical Broadcast Channel (PBCH), Physical Control Format Indicator Channel (PFICH), Physical Downlink Control Channel (PDCCH), CRS, channel state information (CSI) RS (CSI-RS), and synchronization signals.

In the uplink direction, several WTRUs may be transmitting to a common receiver. Methods are described hereafter to resolve the collisions among the transmitting nodes. In the uplink direction, channel access may consist of the following: channel sensing to find an idle channel; and contention resolution among the WTRUs that find a channel idle at the same access opportunity.

The current scheduled method for uplink (UL) access in LTE may not contend with issues related to carrier sense. The granting entity, (e.g., a base station), may not know the current state of channel occupancy at the time the WTRU may begin transmitting after an LTE grant. New mechanisms are described hereafter that contend with both CSMA and multi WTRU access.

For uplink Hybrid Automatic Repeat Request (HARQ) operation, a synchronous HARQ may be defined where the downlink acknowledgement (ACK)/negative acknowledgement (NACK) response occurs at a fixed time, (i.e., 4 subframes after uplink transmission in Frequency Division Duplexing (FDD)), in response to the uplink transmission. On the other hand, both adaptive and non-adaptive HARQ may be supported, requiring both PHICH and PDCCH to provide the HARQ feedback.

While adaptive mode exists, the non-adaptive operation may be a basic mode where the set of resource blocks used for the transmission is identical to the initial transmission. A single bit ACK/NACK transmitted on the PHICH may be used. The NACK transmitted on the PHICH may be viewed as a single bit scheduling grant for retransmissions where the set of bits to transmit and the physical resources are known from the previous transmission. The transmit format and the resource block (RB) allocation for the retransmission are the same as the previous transmission. The redundancy version follows a predefined pattern, where the next redundancy version in the pattern is used whenever a NACK is sent on the PHICH.

When an explicit PDCCH response exists, the PHICH may be ignored. A new data indicator in the uplink scheduling grant of the PDCCH may notify the WTRU whether the transport block may be retransmitted. The new data indicator toggles for each new transport block. Since the uplink scheduling grant is sent on the PDCCH, parameters like modulation, coding rate, redundancy version, and RB allocation may be changed for the retransmission.

The current scheduled method for UL access in LTE may not contend with issues related to carrier sense. The granting entity, for example, a base station, may not know the current state of channel occupancy at the time the WTRU may begin transmitting after an LTE grant. Methods are described in greater details hereafter that contend with both CSMA and multi WTRU access. Given the un-deterministic nature of availability of license exempt bands, synchronous HARQ operation in uplink may not always be possible using the same resources as initial transmission. Methods are described hereafter to allow the WTRU to be able to use license exempt spectrum in the uplink after using carrier sensing mechanisms to confirm availability of spectrum.

Figure 3:
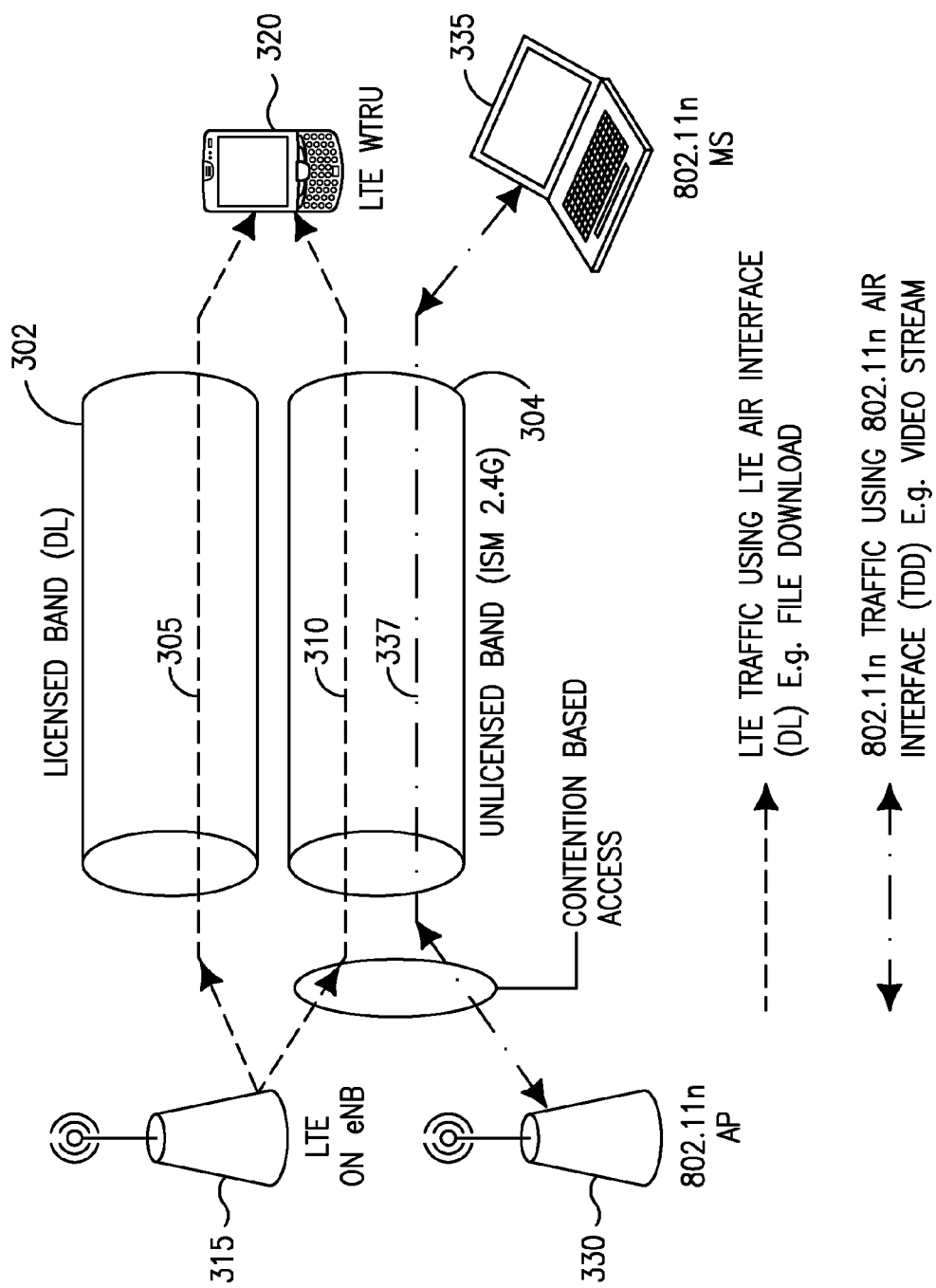
FIG. 3 shows long term evolution (LTE)-advanced (LTE-A) spectrum aggregation between licensed and license exempt bands using carrier aggregation.

FIG. 3 shows the operation of new component carriers in a license exempt spectrum for a LTE system. An LTE-Advanced component carrier framework may be used where a primary carrier 305 operating in the licensed spectrum 302 may provide control and connection establishment between a LTE eNB 315 and a LTE WTRU 320 and a new component carrier 310 operating in a license exempt spectrum 304 may provide bandwidth extension for wireless communication between the LTE eNB 315 and a LTE WTRU 320. The license exempt spectrum 304 may also support a communication link 337 between an IEEE 802.11n access point (AP) 330 and an IEEE 802.11n mobile station (MS) 335. The access to the license exempt spectrum 304 may be contention based. For purposes of non-limiting examples, the license exempt spectrum may include at least the TVWS spectrum, the ISM spectrum and/or the UIII spectrum.

Figure 4:
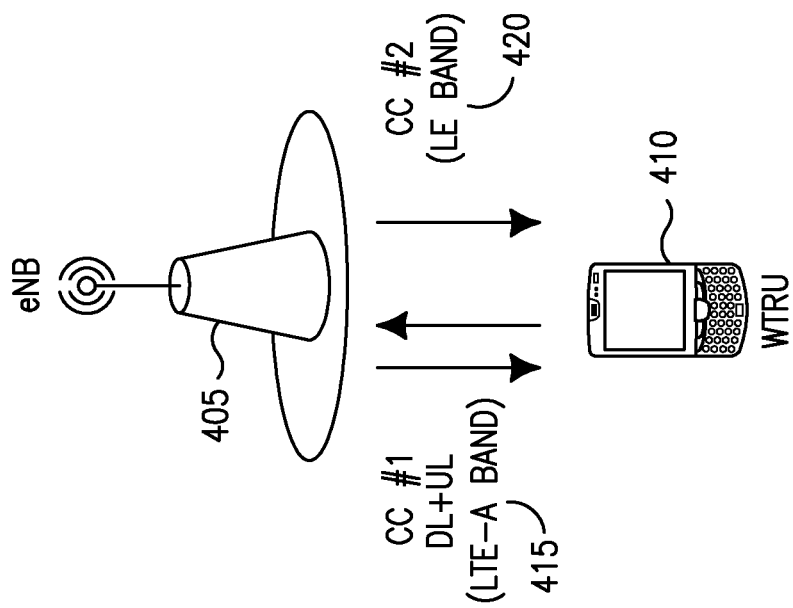
FIG. 4 shows carrier aggregation for LTE licensed band component carrier operating in downlink (DL) and uplink (UL) with additional supplementary carrier operating in DL direction only.

As described in greater detail hereafter, two deployment scenarios may be considered for use of the license exempt spectrum using the carrier aggregation framework. FIG. 4 illustrates a first scenario between an eNB 405 and a WTRU 410. In this scenario, carrier aggregation aggregates LTE licensed band component carriers 415 operating in the downlink (DL) and uplink (UL) with license exempt supplementary carriers 420 operating in the DL direction only.

Figure 5:
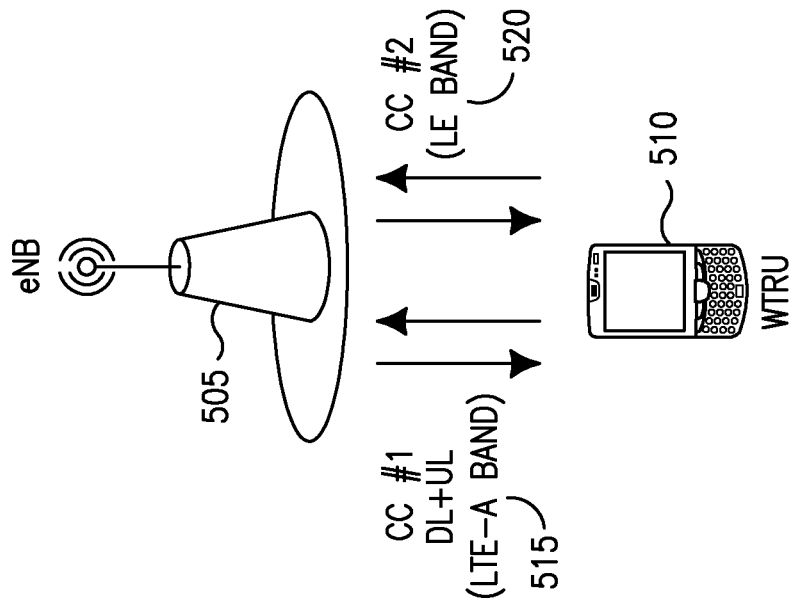
FIG. 5 shows carrier aggregation for LTE licensed band component carrier operating in DL and UL with additional supplementary carrier operating in DL and UL direction.

FIG. 5 illustrates a second scenario between an eNB 505 and a WTRU 510. In this scenario, carrier aggregation aggregates LTE licensed band component carrier 515 operating in the DL and UL with license exempt supplementary carriers 520 operating in the DL and UL direction.

The component carriers operating in the license-exempt (ISM, UNII or TVWS) spectrum may need to operate with predetermined restrictions. A new non-backward compatible carrier type for operation in the license exempt spectrum may be used, which may be referred to hereafter as a supplementary carrier. The supplementary carrier provides a method to extend LTE-A carrier aggregation into the license exempt spectrum.

In at least one embodiment, the supplementary carrier may not be operated as a single carrier (stand-alone), but may be a part of a component carrier set where at least one of the carriers in the set is a stand-alone-capable carrier.

Supplementary carriers may be subject to "listen-before-talk" or sensing to determine suitability before transmission. This may result in the implementation of several feature changes as compared to a secondary component carrier. The differences which in part define the supplementary carrier are given in Table 3.

TABLE 3

| Feature | Secondary CC | Supplementary CC |
|---|---|---|
| DL Channel Access | NB assumes exclusive channel usage (except as coordinated by ICIC procedures) | NB cannot assume exclusive channel usage, and may perform sensing prior to transmission |
| UL Channel Access (UL Grant) | WTRU assumes exclusive channel reservation for fixed or semi-persistent period. | WTRU cannot assume exclusive channel usage, and may perform sensing prior to transmission |
| UL HARQ | Synchronous | May be synchronous or asynchronous |
| Synchronization Signals | CC are backward compatible and include synchronization channel (P-SCH, S-SCH) | Do not include synchronization channels |
| System information | Each CC broadcasts system information | System information is provided using dedicated signaling on the associated licensed (primary CC) |
| Control channel | Each CC has PDCCH, PCFICH, PHICH (downlink) and PUCCH (uplink) control channels | All control channels are mapped to primary CC in the licensed band, and cross-carrier scheduling is used |
| Reference symbols | Common reference symbols (CSI-RS) are always transmitted | CSI-RS transmission is affected by Sensing: in one case, the power and/or periodicity is reduced such to avoid impact to other devices. In another case CSI-RS transmission occurs only if prior sensing indicates the channel is clear. In another embodiment, the CSI-RS may continue to be transmitted in a Rel-10 compatible manner. |
| Frame Timing | Secondary CC's are synchronized and time aligned to primary | May be offset in time from primary CC |

Additional features that may be implemented for a supplementary carrier for operation in license exempt bands are described in greater detail hereafter.

A transmitter, either at the base station or WTRU, may be configured to sense before transmission in license exempt spectrum. The WTRU may be configured with a CC on the licensed spectrum. The Primary Component Carrier on the downlink or uplink link may always be a component carrier from the LTE licensed band.

The cross-carrier scheduling may be assumed for scheduling of the supplementary carrier. As a baseline, cross-carrier scheduling may be implemented using the Carrier Indicator Field (CIF) on the PDCCH. The PDCCH on a component carrier may assign physical downlink shared channel (PDSCH) or physical uplink shared channel (PUSCH) resources in one of multiple component carriers using the CIF. The downlink control information (DCI) formats may include a 1-3 bit CIF. This may include reusing the legacy PDCCH structure, (e.g. coding, same control channel elements (CCE) based resource mapping). To enable cross-carrier scheduling, the following may be assumed on use of the CIF: a) configuration for the presence of CIF is WTRU specific, (i.e. not system-specific or cell-specific); b) CIF, (if configured), is a fixed 3-bit field; and c) CIF, (if configured), location is fixed irrespective of DCI format size.

A primary component carrier may be used for time-critical control and feedback signaling, for example, channel quality indicator (CQI), ACK/NACK, scheduling request (SR), and PUCCH signaling messages.

The WTRU may apply the system information acquisition and change monitoring procedures only on the primary cell. For the supplementary carriers operating in the new spectrum, the E-UTRAN may provide system information relevant for operating the concerned cell in RRC_CONNECTED via dedicated signaling when adding a new cell on the supplementary carrier.

A separate HARQ entity may be associated with the supplementary carrier.

The WTRU sees a license exempt supplementary carrier frequency as any other carrier frequency and expects a measurement object to be set up for measurements.

If the supplementary carrier is configured for operation on the license exempt band in the uplink direction, the uplink control information (UCIs) may be multiplexed in the PUCCH, and the PUSCH carrying upper layer control information may map to the component carrier in the licensed band. The PUCCH multiplexing may be performed according to legacy carrier aggregation, but the PUSCH transmission may be performed differently. Accordingly, PHICHs may be multiplexed onto the component carrier in the licensed spectrum.

For synchronization channels, component carriers that operate using the license exempt spectrum may be non-backward compatible. They may not need to transmit synchronization signals, as the WTRU may not be searching for supplementary carriers using the cell search procedure. There may be a related stand-alone component carrier that the WTRU may be monitoring simultaneously; hence cell search may be performed through that component carrier.

Supplementary carriers may not broadcast system information. The related system information may be provided using dedicated signaling on the associated stand-alone primary component carrier(s).

There may be no downlink control channels such as PDCCH/PHICH/PCFICH or uplink control channel such as PUCCH. These may be handled through cross-CC scheduling and related implicit resource mappings.

Demodulation reference symbols (DMRS) are transmitted in the PDSCH in a manner similar to other CCs.

Common reference signals (CSI-RS) may need to be transmitted. Even though the WTRU may not perform cell search on supplementary carriers, it may perform measurements on the supplementary carriers to allow the base station some information about when to configure the WTRU to utilize the carrier. Common reference symbols may need to be transmitted, when possible, for CQI measurements, CC-specific time/frequency tracking and the like. CSI-RS may be transmitted periodically without sensing if it is determined that such transmissions are of a predetermined impact to other devices. Alternatively, CSI-RS may be tentatively scheduled with sensing occurring prior to each transmission, or with a fixed pattern a priori known to the WTRU, (the base station will already know how the CQI reports are calculated).

An extension carrier may also be used, which may operate as a non-backward compatible carrier with similar restrictions. Although a supplementary carrier may be associated with an independent HARQ entity, the extension carrier may not be associated with an independent HARQ entity.

In another embodiment, some or all of the control channels may be mapped to a supplementary carrier. For example, DL control channels such as PDCCH may be carried on the supplementary carrier whereas UL control channels may still be mapped to the primary component carrier.

Control signaling on primary component carriers may be used to send critical control signaling on less interfered licensed carriers. Depending on the frequency band and other specific characteristics of the corresponding supplementary carrier, the supplementary carrier may be reliable enough to carry control channel traffic when the carrier is available for transmission. In instances where control overhead on the primary component carrier is above a predetermined threshold, control channels may be mapped to supplementary carriers.

In other scenarios such as heterogeneous networks, even if control channel reliability is increased, data channels, (i.e., PDSCH/PUSCH) may deal with the interference. Interference conditions in heterogeneous networks and the techniques to deal with those conditions may be different than in homogenous networks. In such scenarios, it may not be worth sending control channels on the primary component carrier, (increasing overhead on the primary component carrier), when data channels may not be used due to poor performance. In these cases both control and data traffic may be mapped to the supplementary carrier such that both control and data go hand-in-hand.

Figure 6:
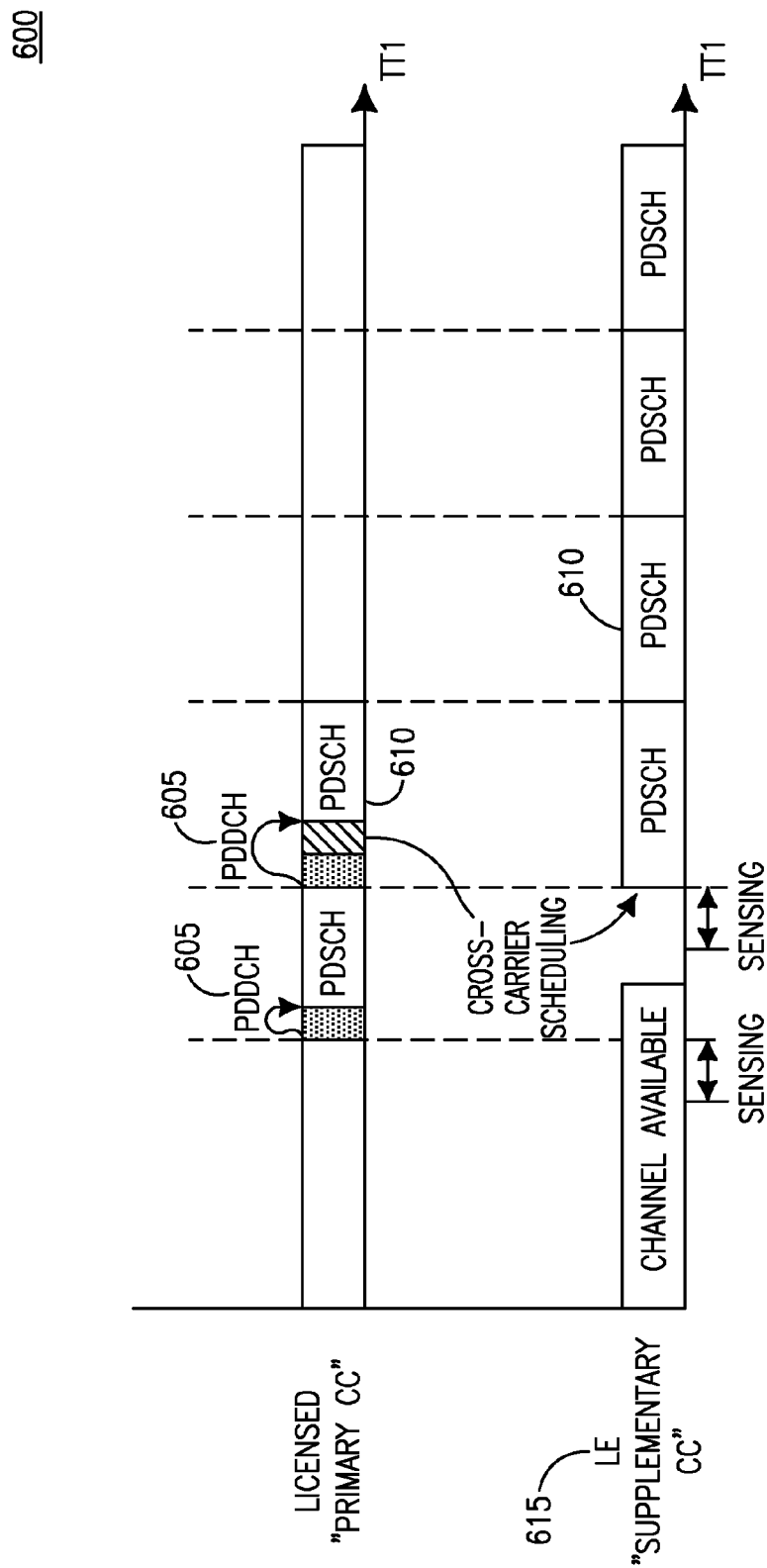
FIG. 6 shows an example of cross-carrier scheduling and carrier sensing.

FIG. 6 shows an example timeline 600 of PDCCH 605 and PDSCH 610 transmission at the base station to support supplementary carriers 615 using cross-carrier scheduling. The frame structure of the supplementary carrier 615 may not have PDCCH information. In this case the WTRUs may receive and buffer the supplementary carrier 615 PDSCH information before the PDCCH is completely decoded in case the data is allocated to them. If the supplementary carrier 615 is mapped to the uplink in the licensed band, this may reduce the time available to send CQI and HARQ ACK/NACK responses to subframes transmitted on the supplementary carrier.

Figure 7:
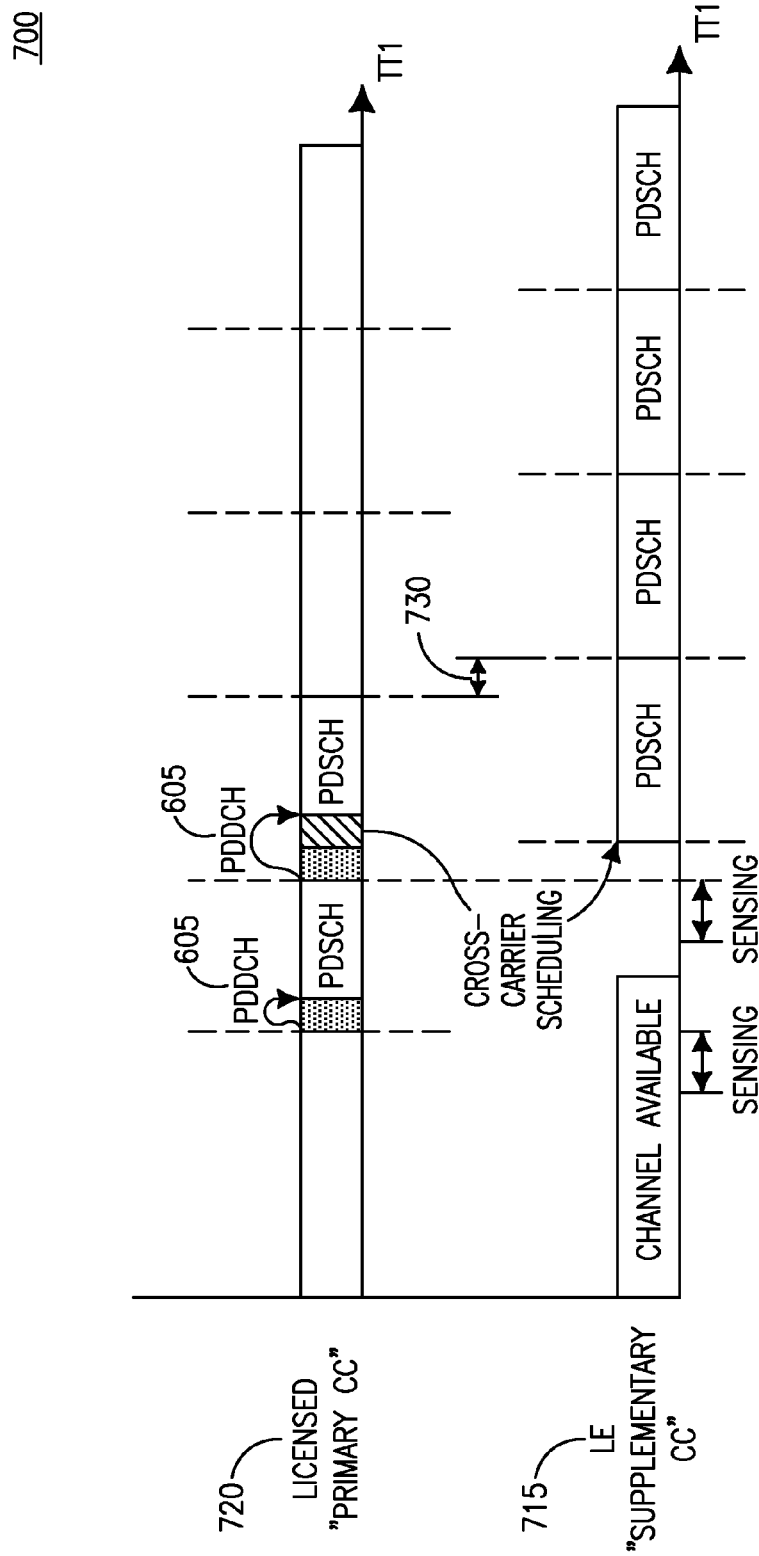
FIG. 7 shows an example of cross-carrier scheduling and carrier sensing with TTI offset on Supplementary carrier.

FIG. 7 shows an example timeline 700 of cross-carrier scheduling and carrier sensing with TTI offset 730 on the supplementary carrier 715. The TTI boundary schedule of the supplementary carriers 715 may be offset with respect to the primary carrier 720 by a delta greater than maximum PDCCH duration. As shown, there is a TTI offset 730 on the supplementary carrier 715 prior to the PDSCH scheduling after sensing is performed on the supplementary carrier 715.

In another example, a semi-persistent scheduling grant may be used to allocate resources on the supplementary carrier with an inter-TTI interval of one. This may avoid the issue of decoding the PDCCH per subframe.

The WTRU may adopt a single wideband-capable, (i.e., >20 MHz), RF front end, (i.e., mixer, Automatic Gain Control (AGC), analog-to-digital converter (ADC)), and a single fast Fourier transform (FFT), or alternatively multiple "legacy" RF front ends (<=20 MHz) and FFT engines. The selection between single or multiple transceivers may be determined based on power consumption, cost, size, and flexibility to support other aggregation types. Depending on the deployment scenario, the RF capabilities of the WTRU, and the mode of operation of the system, duplexing examples are described herein below.

In one example, a uni-directional operation with license exempt spectrum (DL operation) may be implemented. As shown previously in FIG. 4, if the license-exempt band is used in the single direction, and if the system is a frequency division duplexing (FDD) system, the entire band except the predetermined guard bands at both ends may be regarded as one or multiple component carriers in the same direction depending on the bandwidth of the new band. The uplink may be assumed to be on the licensed band.

Figure 8:
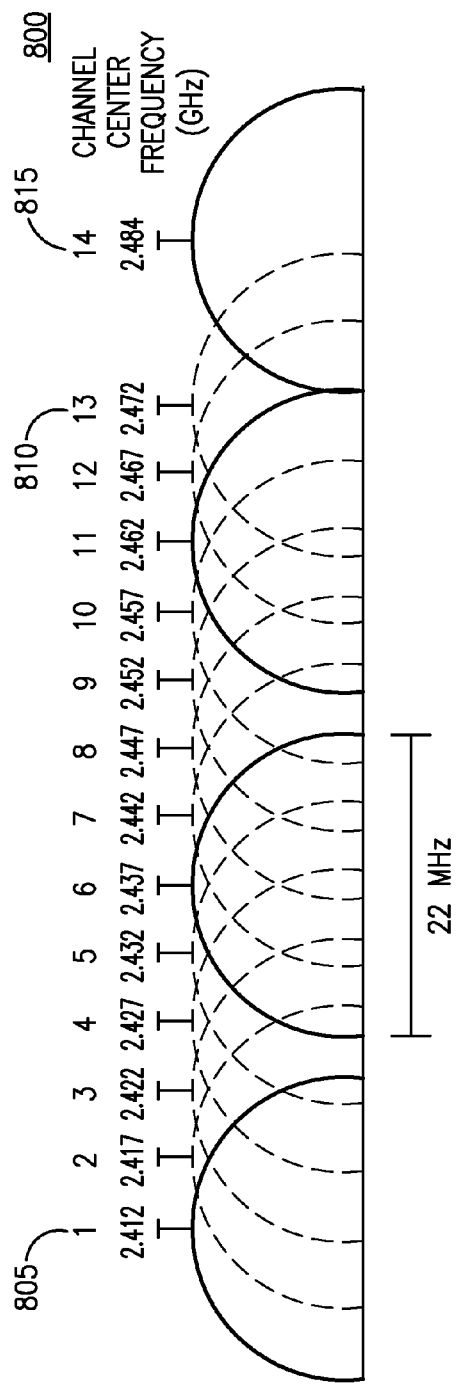
FIG. 8 shows a graphical representation of Wi-Fi channels in 2.4 GHz band.

FIG. 8 shows a graphical representation of Wi-Fi channels 800 in the 2.4 GHz band. IEEE 802.11 devices divide each of the operational bands into channels, for example the 2.4000-2.4835 GHz band is divided into 13 channels each of width 22 MHz but spaced 5 MHz apart, with channel 1 805 centered on 2.412 GHz and channel 13 810 centered on 2.472 GHz. Japan adds a 14th channel 815 12 MHz above channel 13.

Figure 9:
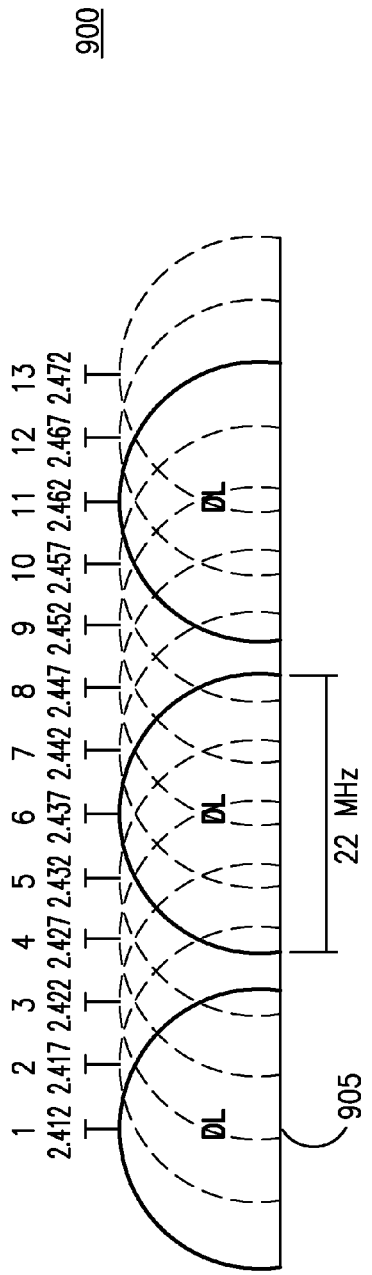
FIG. 9 shows a wide-band/narrow-band simple operation on 2.4 GHz ISM band.

FIG. 9 shows an example configuration for wide-band operation over the 2.4 GHz ISM band 900. For coexistence with IEEE 802.11 users, and proper operation of IEEE 802.11 carrier sense algorithms, one alternative is to operate using the entire 22 MHz channel blocks 905, to ensure the carrier sensing using energy detection across the band detects the LTE operation in the band. The following CC sizes may be supported—1.5 MHz, 2 MHz, 5 MHz, 10 MHz and 20 MHz. For backward compatibility, one alternative is to use defined, (e.g. 20 MHz LTE), component carrier sizes for resource allocation and scheduling, but add filler bits to the additional 2 MHz, or increase guard band to cover the additional 2 MHz band. Another alternative is to increase the number of resource blocks for the wider channel bandwidth of 22 MHz, and correspondingly update the control information including the format of PDCCH, DCI bits, and the like. The additional/new band information may be signaled in the system information for the supplementary carrier using dedicated signaling.

Bi-directional operation with license exempt spectrum may be implemented. To support both downlink and uplink on license exempt bands, several alternatives are available, depending on the mode of operation of the licensed bands.

Figure 10:
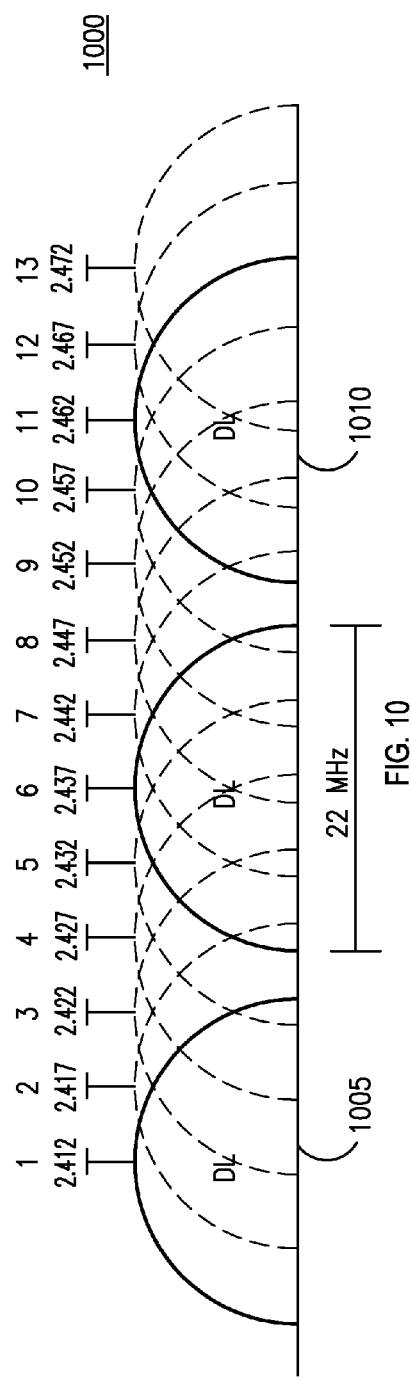
FIG. 10 shows a narrow band full-duplex frequency division duplexing (FDD) operation on 2.4 GHz industrial, scientific and medical (ISM) band.

In one case, the system is operating in the FDD mode, the license exempt bandwidth may be split up into non-overlapping channels, i.e., a UL channel 1005 and a DL channel 1010, as shown in FIG. 10. Each channel may be operated in a single direction, for a full-duplex FDD operation.

Figure 11:
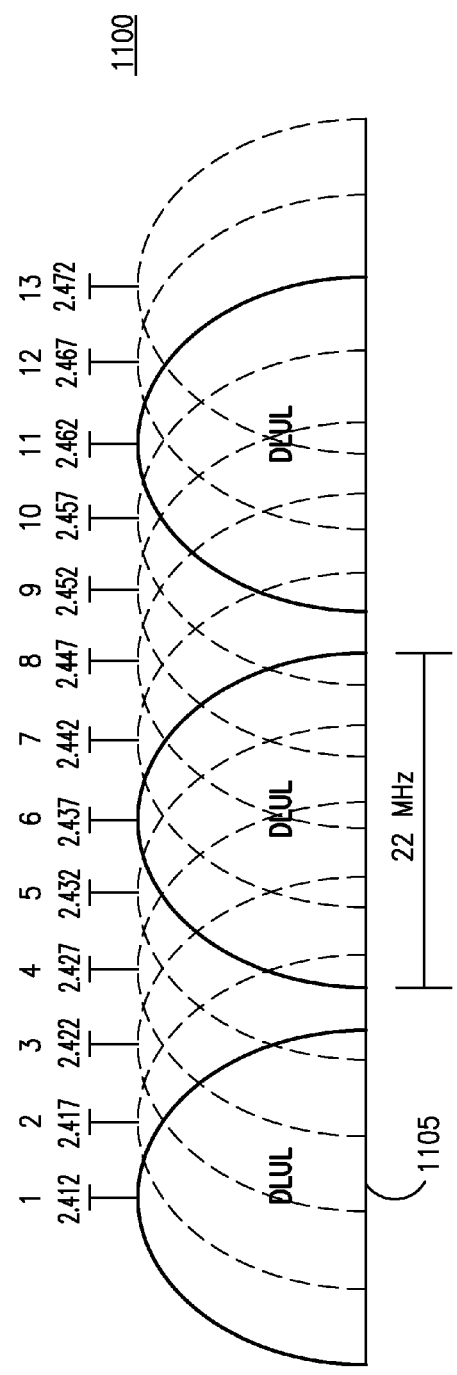
FIG. 11 shows a wideband half-duplex time-division duplexing (TDD) operation on 2.4 GHz ISM band.

In a second case, the system is operating in the time-division duplexing (TDD) mode as shown in FIG. 11. The license exempt bandwidth may be shared in a time division multiplexing (TDM) manner, similar to IEEE 802.11 operation. Each 22 MHz channel 1105 may have DL and UL capability.

In both cases, the band may still be shared with other users of the spectrum in a CSMA (TDM) manner. The duplex type selected for the component carrier in the license exempt spectrum shall see to it that the spectrum is relinquished only when it is intended. In other words, the control of the license exempt spectrum may not be compromised by any feature of the duplex structure. Intentional and preemptive occupancy of the license exempt spectrum may be exploited to de-randomize the spectrum usage.

Figure 12:
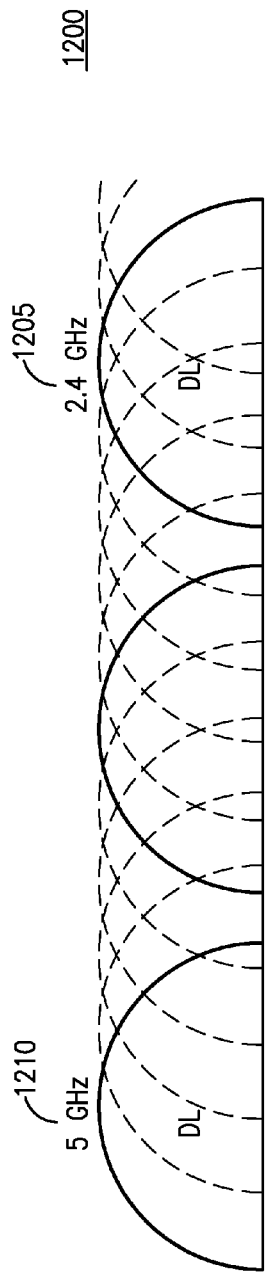
FIG. 12 shows an Inter-band Full-duplex FDD operation on 2.4/5 GHz.

FIG. 12 shows an example of inter-band full-duplex FDD operation on a 2.4/5 GHz spectrum 1200. In this example, the uplink and downlink channels may be on different bands of the license exempt spectrum. For example, the DL channel 1205 may operate on the 2.4 GHz band and the UL channel 1210 may operate on the 5 GHz band.

Figure 13:
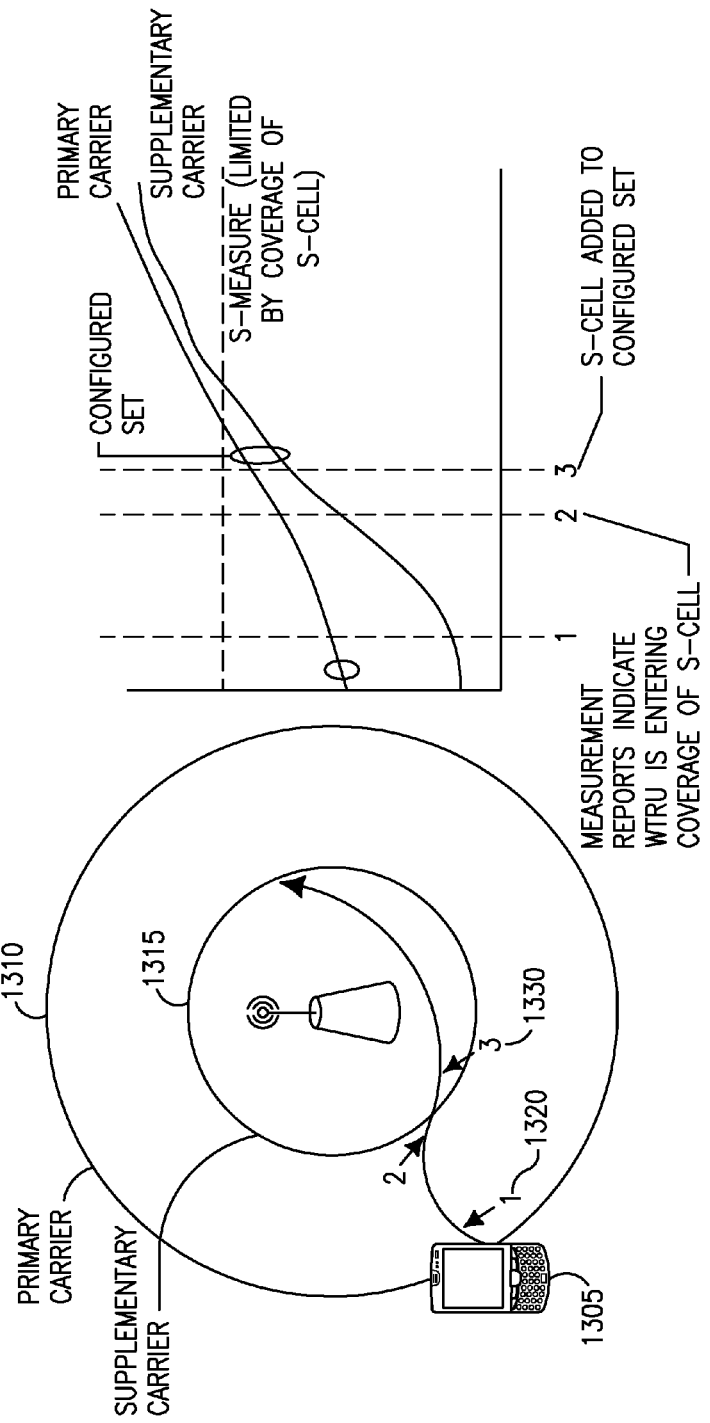
FIG. 13 shows an example of supplementary carrier cell management.

FIG. 13 shows an example of supplementary carrier cell management. In this example, a WTRU 1305 may be configured with two CCs, a primary carrier 1310 and a supplementary carrier 1315. The supplementary carrier 1315 on a license exempt band may have a smaller coverage area than the primary carrier 1310 on the licensed LTE band.

At point 1 1320, the WTRU 1305 may be configured with only the primary carrier 1310. When the WTRU 1305 arrives into the coverage of the supplementary carrier 1315, the supplementary carrier 1315 should be added to the configured set. A S-measure may describe when a WTRU is required to perform intra-frequency, inter-frequency and inter-RAT measurements. If the serving cell Reference Signal Received Power (RSRP) is above the S-measure, the WTRU is not required to perform measurements. To support secondary cell (Scell) handovers, a new measurement event A6 has been introduced. Event A6 is defined as intra-frequency neighbor becomes better than an offset relative to an SCell. For this measurement, the neighbour cells on an SCC are compared to the SCell of that SCC. This is in addition to the existing event A3, which is used to detect when neighbor cells becomes better than a primary cell (Pcell).

For supplementary carriers, the coverage of the primary carriers on licensed bands and the supplementary carrier on license exempt bands may have substantial differences in range and coverage due to regulations on transmit power and frequencies of operation. If there is only one S-measure for the entire system, as currently defined, the WTRU will not measure the supplementary carriers if the primary carrier strength is above the threshold.

A new event called A3-license exempt (A3-LE) may be used for neighbor cell measurements on each license exempt band. At Point 2 1325, a measurement report may indicate that the WTRU 1305 is entering the coverage area of the cell of the supplementary carrier 1310, and at Point 3 1330, an event A3-LE is triggered and the supplementary carrier 1315 is added to the configured set.

In some scenarios, the WTRU may not know when to make the measurements on the license exempt band. Since the base station may sense band availability first and then transmit signals to be measured, (e.g., CRS, synchronization channels and the like), signals may not be available for measurement by the WTRU at apriori known times.

This may be addressed by the methods described herein below. In one example, the base station may be configured to determine when it may transmit signals to be measured in the unlicensed band, e.g., signals may be transmitted on a DL CC (or serving cell) in the unlicensed band.

In another example, the base station may send a trigger to the WTRU to inform it to make the measurements at the same or fixed known time later, and transmit the signals to be measured. The trigger may be sent on a CC (or serving cell) in the DL licensed band, e.g., on the DL primary CC (or serving cell). Trigger may be included with an UL grant. Trigger may be included with a DL resource assignment for a DL CC (or serving cell) in the licensed or unlicensed band. Trigger may be sent in a new DCI format or in a modified version of an existing DCI format.

In another example, a trigger in subframe N may inform the WTRU that the signals to be measured on the CC (or serving cell) in the unlicensed band are available in subframe N. Alternatively, a trigger in subframe N may inform the WTRU that the signals to be measured on the CC (or serving cell) in the unlicensed band are available in subframe N+k where the value of k is predefined and known to both the WTRU and the base station. Alternatively, the value of k may be configurable by the base station via signaling. Signaling may be via the physical layer or radio resource control (RRC) signaling. The signaling may be dedicated, (i.e., directed to one specific WTRU or a group of WTRUs), or it may be common to all WTRUs, for example, broadcasted.

The signals to be measured may be available for a single subframe, for a predefined number of subframes known to the WTRU, or for a number of subframes that is configured by the base station via signaling. The signaling may be dedicated, (i.e., directed to one specific WTRU or a group of WTRUs), or it may be common to all WTRUs, for example, broadcasted.

The common reference signals to be measured may be dynamically selected from one or more pre-defined schemes. The selection of which scheme may be done via the triggering mechanisms described herein above. Each scheme may be defined as a unique pattern of reference symbols, (slots and frequencies), that is preconfigured by the base station such that measurements signaling may avoid time and/or frequency collisions with other interferers.

The WTRU may only make measurements on a DL CC (or serving cell) in the licensed exempt band when it knows that the signals are available based on an indication from the base station in accordance with one or more of the above.

The supplementary component carrier in the license exempt spectrum may be used for the PDSCH, and the reference signals necessary for CSI estimation and PDSCH demodulation. Other embodiments may not include a synchronization signal on the extension carrier. In such a case, the primary component carrier frequency may be close to that of the extension component carrier and as a result both timing and frequency adjustments derived from the primary component carrier also apply on the extension carrier.

Synchronization information may be derived separately by the industrial, scientific and medical (ISM) transceiver using a preamble based approach. The use of the preamble may be useful in cognitive radio operation over non-contiguous spectrum in OFDM systems.

Timing and frequency synchronization may be achieved using a frame preamble, periodic beacons, or using primary and secondary synchronization symbols.

Figure 14:
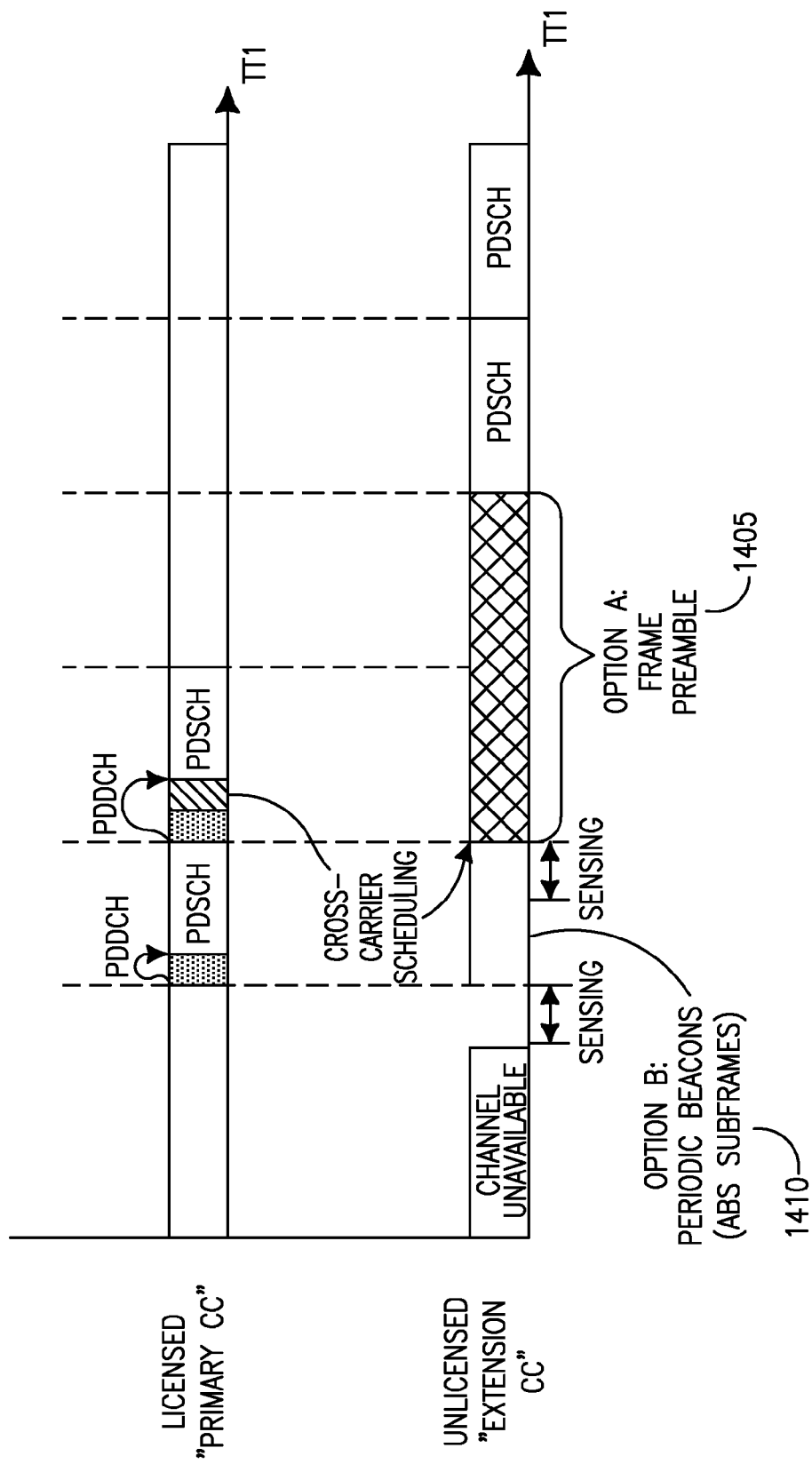
FIG. 14 shows frame preamble and periodic beacon synchronization.

FIG. 14 shows the use of a frame preamble 1405 for synchronization. For the license exempt band operation, since the availability of license exempt spectrum may not be predetermined at any time, timing and frequency synchronization may be guaranteed by inserting preamble information at the start of the frame structure. The preamble may consist of the synchronization information in time and frequency domain. This information may precede any encoded symbols as the receiver may not be able to decode any symbols until frequency lock is attained. The number of bits required for synchronization may depend on a lot of factors like the sub carrier spacing for OFDM, the mobility of the receiver and the like. The number of sub-frames coded with preamble may be signaled to the WTRU separately using a control channel like PHICH.

FIG. 14 also shows the use of periodic beacons 1410 for synchronization. The periodic beacons 1410 may be sent instead or in addition to the frame preamble 1405. The periodic beacons 1410 may be reference symbols sent periodically to perform the dual job of obtaining feedback as well as to keep the receiver frequency synchronized. Periodic beacon sub-frames may be implemented as almost blank sub-frames carrying reference symbols sent periodically with a fixed period, or a period configurable by the base station and signaled to the WTRU. If the carrier is configured with periodic beacon sub-frame(s), the size of the preamble may be reduced or eliminated. Hence, support of periodic beacons 1410 may be added or removed depending on load conditions and other considerations.

The schedule and periodicity of the beacon transmission may be configured to the WTRU using dedicated signaling or in System Information on the primary carrier. This may allow capable and interested WTRUs to be able to listen to the beacon information to detect range and presence of candidate supplementary carriers.

In one embodiment, the resource blocks for beacons implemented as absolute blank sub-frames may be mapped to the guard band adjacent to the supplementary component carrier.

Timing and frequency synchronization may be achieved using Primary and Secondary Synchronization Symbols. Synchronization signals may be transmitted periodically, twice per 10 ms radio frame. In an FDD cell, the Primary Synchronization Symbols (PSS) may be located in the last Orthogonal Frequency Division Multiplexing (OFDM) symbol of the first and 11th slots of each radio frame, thus enabling the WTRU to acquire the slot boundary timing independently of the Cyclic Prefix (CP) length. The PSS and SSS may be transmitted in the central six Resource Blocks (RBs), enabling the frequency mapping of the synchronization signals to be invariant with respect to the system bandwidth, (which may vary from 6 to 110 RBs). This may allow the WTRU to synchronize to the network without any a priori knowledge of the allocated bandwidth. The PSS and SSS may each be comprised of a sequence of length 62 symbols, mapped to the central 62 subcarriers around the d.c. subcarrier which is left unused.

One implementation may be to continue to transmit the PSS and SSS even when the LTE nodes are not transmitting or receiving on the channel. This assumes the channel is being used only in one direction in FDD operation. The following calculations may estimate the impact of continuous transmission of synchronization symbols on carrier sensing of a neighboring 802.11 device carrier sense threshold of −72 dBm.

Assuming pathloss equation of a pico-cell from 36.814, given as:

$$\text{Pathloss} = 140.7 + 36.7 * \log 10(R) \text{ where } R \text{ is km and center frequency} = 2 \text{ GHz} \quad \text{Equation (1)}$$

$$= (txPowerPico/20 \text{ MHz}) * 62 \text{ sub carriers} * 15 \text{ KHz} \quad \text{Equation (2)}$$

Figure 15:
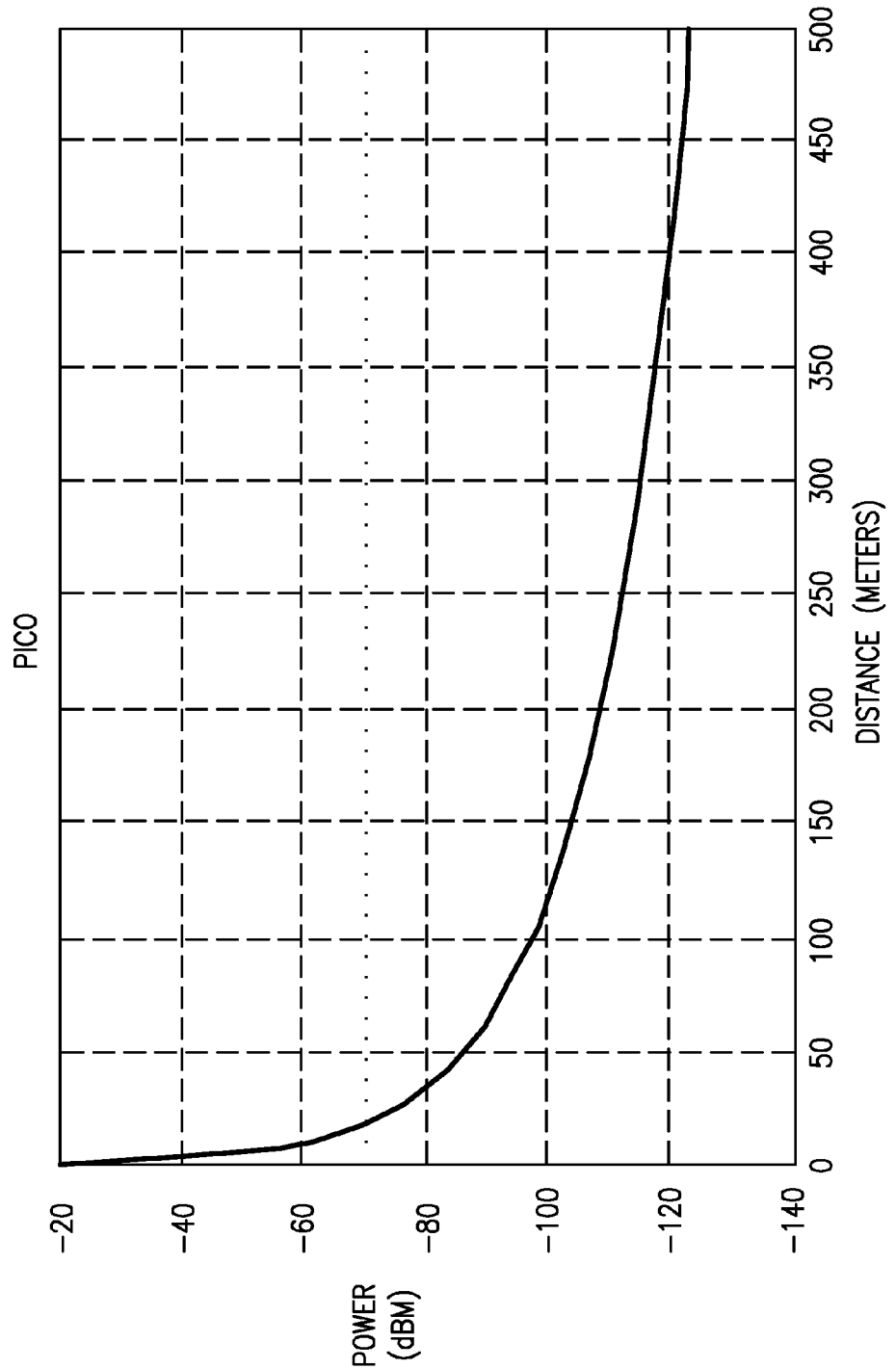
FIG. 15 shows an effect of continuous transmission of Primary Synchronization Symbols (PSS) and Secondary Synchronization Symbols (SSS) on neighboring 802.11 node.

Assuming txPowerPico of 30 dBm, an initial value of ~1.3 dBm and a minimum range of around 18 m for a neighboring 802.11 to not detect interference from the synchronization symbols. FIG. 15 shows a graph of the effect of continuous transmission of PSS and SSS on a neighboring 802.11 node.

Several channel access mechanisms have may be deployed for the cellular nodes operating in a license exempt band. The channel access mechanisms generally consist of two parts: 1) contention with the nodes operating in the same spectrum that may use different protocols or with the nodes that use the same protocol but are not able to communicate with each other; and 2) contention among the WTRUs to access the spectrum. The first part may consist of carrier sensing and other methods to identify an idle channel. The second part may consist of methods that enable simultaneous usage of the idle channel, (as in the uplink direction where several WTRUs may communicate with a single receiver). The downlink and uplink communications among the cellular nodes in the license exempt spectrum is separated in the frequency or time domains. FDD or TDD may be used for this purpose.

In addition, since the license exempt spectrum is opportunistically available, there is no guarantee of availability of resources. Each component carrier may have a HARQ entity associated with it. Data in a HARQ process may have to wait for a next transmission opportunity when the channel is available, which may cause delay. To avoid these delays, data may be allowed to fallback to licensed spectrum, if license exempt spectrum is not available. The license exempt spectrum is sensed before every TTI and if the spectrum is not available, the frame may be sent on the same TTI in the primary CC. In one embodiment, a modified or new DCI format may simultaneously include grants for sending data on license exempt carrier and fallback carrier. This may avoid delays involved in rescheduling, which may be of the order of milliseconds. If there is a fallback, the same block coded for secondary CC may or may not be used for primary CC.

Figure 16A:
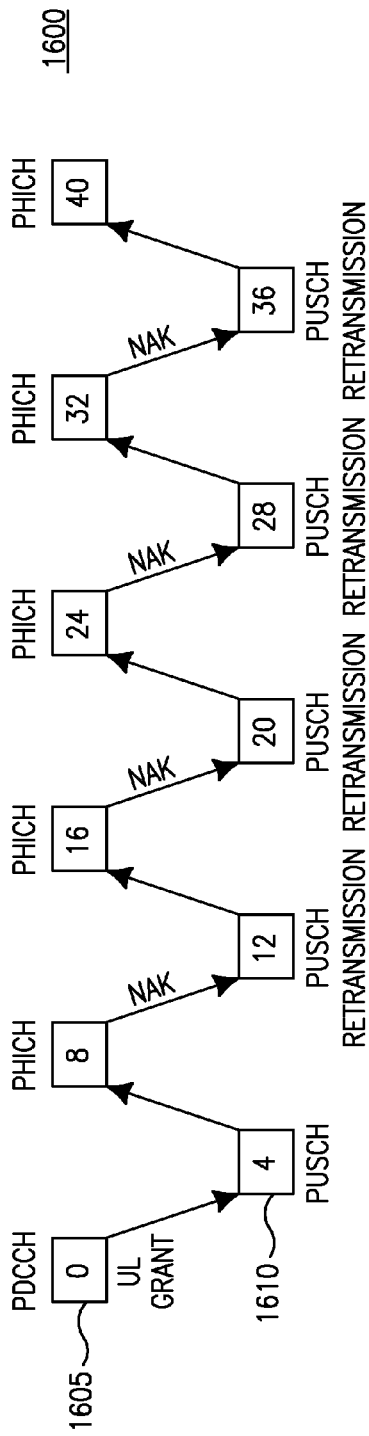
FIG. 16A and FIG. 16B show a UL hybrid automatic repeat request (HARQ) timing for FDD and TDD Configuration 1, respectively.
Figure 16B:
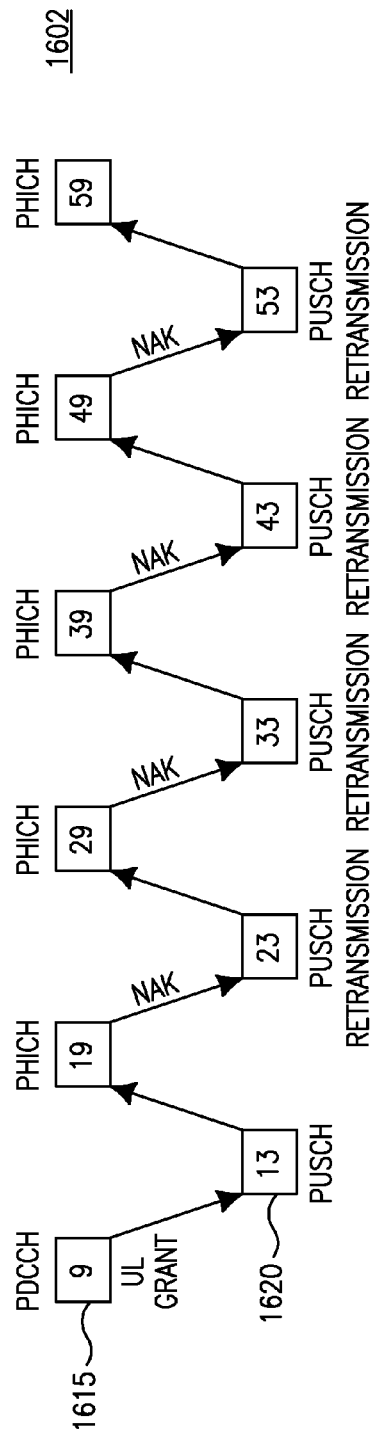

In some communication systems, UL HARQ is synchronous, which means the PDCCH (UL grant), PUSCH, PHICH and PUSCH retransmission may follow the timing given in FIGS. 16A and 16B, which shows the TTI timing relation of the grants received 1605 and 1615, respectively, and the transmissions 1610 and 1620, respectively. FIG. 16A shows the UL HARQ timing 1600 in FDD mode and FIG. 16B shows the UL HARQ timing 1602 in TDD mode. When the WTRU gets an uplink grant on a certain HARQ process in time N−4, the WTRU initiates mechanisms to generate a transmission to be sent on the PUSCH at time N.

The current scheduled method for UL access in LTE may not contend with issues related to carrier sensing. The granting entity (base station) may not know the current state of channel occupancy at the time the WTRU may begin transmitting after an LTE grant. Thus, new mechanisms are described hereafter that contend with both CSMA and multi-WTRU access. These methods may enable asynchronous uplink operation.

In case of license exempt spectrum, the base station may be configured to send the WTRU a "soft-grant" for the supplementary carrier, which is defined as a grant that may be opportunistically used if the spectrum is sensed to be available. A "soft-grant" may correspond to a single resource allocation, (i.e., a resource allocation in a single subframe), or a "soft-grant" may be defined as a resource allocation with multiple "transmission opportunities". A transmission opportunity may comprise the beginning of the sub-frame where the WTRU is allowed to transmit using the associated resource allocation provided in the soft grant.

Figure 17:
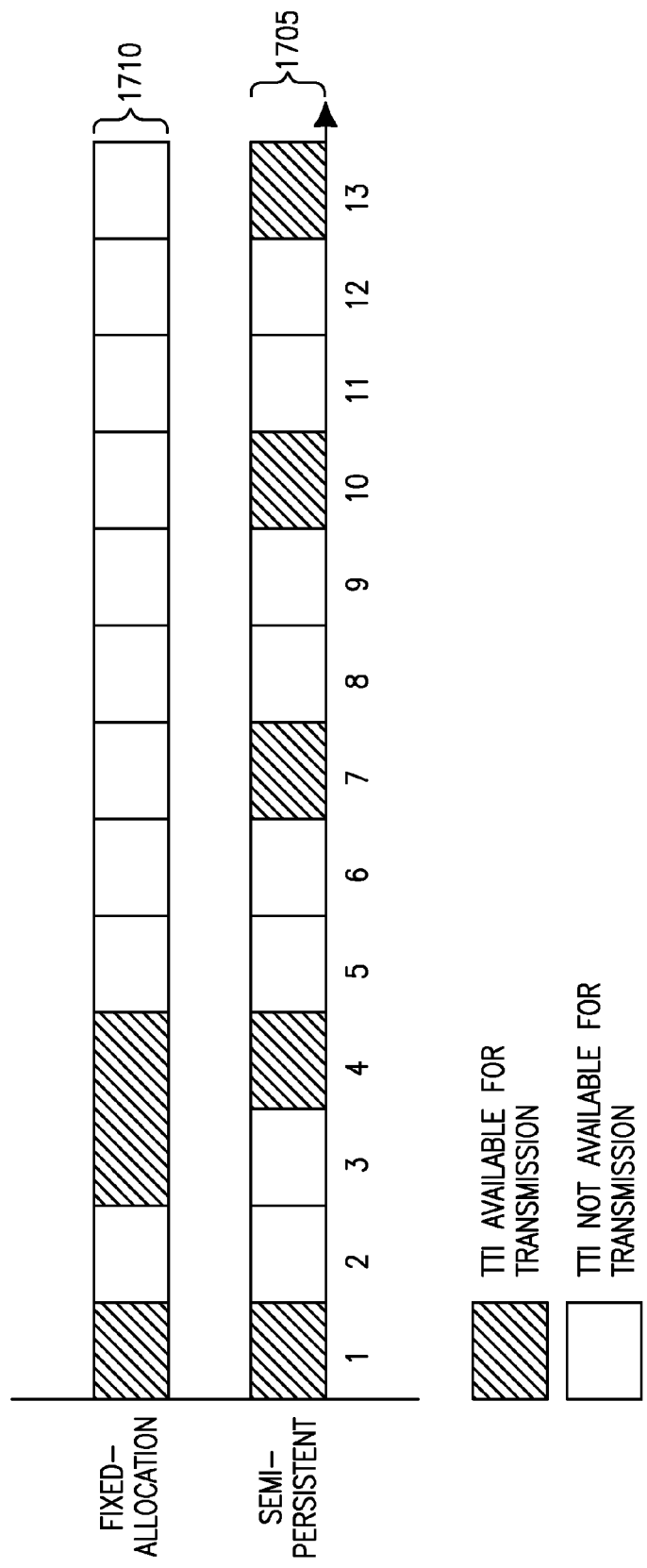
FIG. 17 shows a diagram of semi-persistent and fixed-allocation soft-grants.

For example, a transmission opportunity may correspond to a semi-persistent pattern 1705 of TTIs or fixed-allocation 1710 of multiple TTIs as shown in FIG. 17. Another example may be an allocation with a starting subframe, (for example, subframe n+4 following a grant received in subframe n), and a number of consecutive subframes (for example, n+5, n+6, . . . n+m).

In each allocated TTI, if the spectrum is unavailable, the WTRU may ignore the grant. The base station may be able to detect discontinuous transmission (DTX), and then provide the WTRU with another grant.

In case of license-exempt, it may be difficult for the base station to detect WTRU DTX, because the channel may be used by a non-LTE user in that time. To mitigate the WTRU DTX detection problem, (in the context of the "soft-grant" defined above), the WTRU may perform sensing at the start of each of the sub-frames allocated for UL transmission within the soft grant. If the spectrum is available, the WTRU transmits UL data (PUSCH) on the supplemental carrier and may send an indication to the base station on the resources used, (for example, on the PUCCH or PUSCH), on the UL carrier in the licensed band, for example on the UL primary CC, (also called primary serving cell), to inform the base station that UL data has been transmitted on the Supplementary Carrier. For example, if the WTRU receives a grant in subframe n for resources on the supplementary carrier which corresponds to resources in subframe n+x (e.g., x=4) on that carrier, if the WTRU senses that it may transmit in that subframe, the WTRU transmits on those resources and also sends an indication, (that it transmitted), to the base station in the licensed band, such as on the PUCCH of the primary CC. To minimize overhead the indication may be a single bit or a small number of bits.

The WTRU may perform, (or begin to perform), sensing some delta time before the start of a subframe to be considered for transmission so that the channel is idle for a period of time that may be required by another technology that may be using the unlicensed band, (for example, Wi-Fi requires the channel to be idle for the SIFS period before a station may use it).

Given a soft grant that corresponds to an allocation of more than one TTI, the WTRU may perform sensing for each allocated TTI and transmit in the TTI that is idle. Alternatively, the WTRU may perform sensing for each allocated TTI and as soon as it finds one TTI that is idle, it may transmit in that TTI and then stop looking for idle TTIs related to that grant. (i.e., transmission for that grant may be considered accomplished). Alternatively, after transmitting in one TTI associated with a grant, the WTRU may only use additional TTIs related to that grant for retransmissions and may wait for another grant for new transmission. For each TTI in which the WTRU transmits on the Supplementary carrier, the WTRU may send an indication (that it transmitted) to the base station on an UL CC in the licensed band as described above.

In allocated TTIs in which the WTRU is unable to transmit due to the channel not being idle, the WTRU may provide an indication to the base station that it was not able to transmit in the subframe in which it was granted resources. This indication may be sent by the WTRU on resources (for example, PUCCH or PUSCH), on an UL carrier in the licensed band, for example on the UL primary CC (primary serving cell). For example, if the WTRU receives a grant in subframe n for resources on the supplementary carrier which corresponds to resources in subframe n+x (e.g., x=4) on that carrier, and if the WTRU senses that it cannot transmit in that subframe, the WTRU sends an indication, (that it did not transmit), to the base station in the licensed band, such as on the PUCCH of the primary CC. If the allocation is for multiple TTIs, the WTRU may send an indication to the base station that it did not transmit for each of the allocated TTIs in which it did not transmit. If the WTRU no longer looks for allocated TTIs after it transmits in one TTI for a given allocation, the WTRU need not send any indications for the allocated TTIs after the transmission.

In another alternative, the WTRU is enabled with an "autonomous" grant mode. When a WTRU determines the channel is available, it may autonomously decide the resource usage and use it to transmit on the subframe on the data channel (e.g. PUCCH) of the Supplementary Carrier. The WTRU may simultaneously send its C-RNTI, channel and resource usage and HARQ process information to base station on a carrier in the licensed spectrum, (e.g. on the PUCCH).

In a hybrid approach, the base station may provide a group of WTRUs with a soft-grant at a particular TTI, so a group of WTRUs are allowed to employ sensing and transmit frames only on the corresponding allocated TTIs with "transmission opportunity" along with the provided soft-grant. In another approach, the base station semi-statically configures the group of WTRUs with a resource block usage grant, so that whenever they sense channel availability, they proceed to use the channel using the previously configured resource block grant. Group configuration information may be provided by RRC signaling. This may be a Group ID, group-RNTI and the like.

With respect to retransmission, the default may enable adaptive retransmission by receiving a new grant for retransmission, or in case of an autonomous grant scheme, the WTRU selecting its resource allocation for retransmission. In one embodiment, maintaining synchronous retransmission is possible with the semi-static resource allocation between the WTRUs, in which case the eNB grants sensing opportunities.

Alternatively, retransmission may be routed to the licensed CC.

After the WTRU senses that the channel is idle, the WTRU may wait for certain period of time (say $T_p$) to make sure that the channel is still idle. Even though the mechanism is explained using Wi-Fi network as an example, this approach applies to all other radio access technologies (RATs) that the WTRU is expected to co-exist with in license exempt spectrum. For Wi-Fi networks, $T_p$ may at least be greater than SIFS. In Wi-Fi networks once a station has gained access to the medium, it maintains control of the medium by keeping a minimum gap, the short inter-frame space (SIFS), between frames in a sequence. Another station will not gain access to the medium during that sequence since it must defer for a fixed duration that is longer than SIFS. If not, this may lead to unnecessary and avoidable collisions.

This wait time $T_p$ may be applied before the transmission opportunity or after the transmission opportunity. This may apply in the case of WTRU sensing before transmitting (UL), and/or base station sensing before transmitting (DL). It may also apply in the case of the base station sensing as a receiver.

Whether WTRU waits for $T_p$ before or after the transmission opportunity depends on system deployment and implementation. In some system implementations, it might be tolerable to have $T_p$ after the transmission opportunity and start data transmission one or more OFDM symbols beyond the start of the subframe boundary. Other implementations may allow for sensing time ($T_p$) prior to transmission opportunities where the base station does not schedule any license-exempt (LE) users in the subframe prior to the transmission opportunity for which it has provided a grant.

In the case where back-to-back transmissions are configured by the base station, (either in DL or UL) for license-exempt spectrum, it may be possible to perform sensing at the beginning and end of $T_p$ for the first transmission only in a set of contiguous back-to-back transmissions. Subsequent transmissions may not have to perform sensing for the duration of $T_p$ before transmission. In another embodiment might avoid sensing (channel access sensing) prior to transmission. As long as the transmissions are deemed continuous for this set of contiguous back-to-back transmissions, secondary users of other RAT may not detect channel as idle (for example, SIFS in Wi-Fi), and hence unnecessary contentions and collisions are avoided.

For UL grants, along with grant information, base station may signal whether it is required to perform sensing at the beginning and end of $T_p$ for license-exempt users on the corresponding control channel. The flag(s) to perform sensing at the beginning and end of $T_p$ for license-exempt users may be set only for the first LE user, and these flags may be turned off for all other subsequent license exempt users in a set of back-to-back transmissions. In DL, since the base station is aware of whether the transmissions are back-to-back or not, it may perform sensing at the beginning and end of $T_p$ for license exempt users before first transmission only. Subsequent DL transmissions to other license exempt users may be made without need for sensing or having to wait for $T_p$.

Given the discontinuous nature of channel access in the license exempt spectrum, it may not be possible to rely on periodic cell-specific reference symbols to be present for CQI and channel estimation calculations. However, there are several methods that may be implemented.

One approach may be adding channel estimation reference symbols to the preamble, as suggested herein. The use of preamble to simultaneously provide AGC, timing synchronization, frequency synchronization and channel estimation is similar to 802.11 usage of preamble.

Another approach may be to continue to send the CSI-RS on "almost blank subframes". The ERPE, density and reference symbol pattern might be adaptive based on the presence or absence of other (non-LTE) users of the licensed exempt spectrum. For instance, if the base station has detected other 802.11 users of the spectrum using measurement gaps, the ERPE of the CSI-RS sent on almost blank subframes may be reduced so as to be below the carrier sense energy detection threshold of the 802.11 devices.

FCC regulations on TVWS require the unlicensed users to detect a primary user (within 60 seconds), and vacate the spectrum (within 2 seconds). To ensure these requirements are met, the base station may coordinate a synchronized periodic Silent Measurement Period (SMP) so that all the unlicensed WTRU under the base station control are silent for a fixed sensing duration to detect primary users.

In another solution alternative, the WTRU may be configured with a short and long sensing period. The short period having measurement threshold to detect any energy from "outside device", i.e. device not controlled by the node, and if this lower threshold is met, the base station schedules the WTRUs with a longer sensing period to determine the characteristics and identity of the outside device. The base station may determine, through database lookup, if the outside device is a primary user of the spectrum or not.

The radio link protocol, (RLC) protocol of LTE may apply to carrier aggregation with license exempt spectrum. For acknowledged mode of traffic, cross layer optimizations may be considered to avoid timeouts due to un-deterministic access of license exempt spectrum.

In one alternative, only the RLC unacknowledged mode traffic is sent on the component carriers using the license exempt spectrum.

Embodiments

1. A method for use in a wireless transmit/receive unit (WTRU), the method comprising configuring the WTRU for component carrier operation.

2. The method of embodiment 1, further comprising configuring the WTRU with a primary component carrier for control and connection establishment, the primary component carrier operating in a licensed spectrum.

3. The method of any preceding embodiment, further comprising configuring the WTRU with a second component carrier for bandwidth extension, the second component carrier operating in a licensed exempt spectrum.

4. The method of any preceding embodiment, wherein the second component carrier is a non-backward compatible component carrier.

5. The method of any preceding embodiment, wherein cross-carrier scheduling is used to schedule the second component carrier.

6. The method of any preceding embodiment, wherein a hybrid automatic repeat request is associated with the second component carrier.

7. The method of any preceding embodiment, further comprising receiving and buffering the second component carrier's downlink shared channel information before a control channel information is completely decoded.

8. The method of any preceding embodiment, wherein a schedule of the second component carrier is offset with respect to the primary component carrier, the offset being greater than a control channel duration.

9. The method of any preceding embodiment, wherein backward compatibility is provided by using at least one of filler bits, increased guard bands or increased resource blocks with respect to predetermined component carrier sizes.

10. The method of any preceding embodiment, wherein uplink and downlink communications are on different bands of the license exempt spectrum.

11. The method of any preceding embodiment, wherein uplink and downlink communications are time shared on a same band in the license exempt spectrum.

12. The method of any preceding embodiment, wherein a measurement event for the second component carrier is triggered on entering a coverage area and the second component carrier is added to a configured set.

13. The method of any preceding embodiment, wherein synchronization information is derived separately by the licensed exempt transceiver using a preamble.

14. The method of any preceding embodiment, wherein timing and frequency synchronization is achieved using at least one of frame preamble, periodic beacons, or primary and secondary synchronization symbols.

15. The method of any preceding embodiment, further comprising receiving a soft grant for the second component carrier, the soft grant being a transmission opportunity awaiting confirmation of license exempt spectrum availability.

16. The method of any preceding embodiment, further comprising sending resource availability and control information for the license exempt spectrum on an uplink control channel.

17. The method of any preceding embodiment, wherein the WTRU is enabled with an autonomous grant mode wherein the WTRU is configured to sense license exempt spectrum availability before a transmission time interval (TTI) and on a condition of license exempt spectrum availability, the WTRU is configured to send control information on a uplink control channel to the base station.

18. The method of any preceding embodiment, further comprising configuring the WTRU along with other WTRUs with a sensing opportunity at a given TTI.

19. The method of any preceding embodiment, further comprising transmitting at allocated TTIs on a condition of a positive sensing opportunity.

20. The method of any preceding embodiment further comprising semi-statically configuring the WTRU along with other WTRUs with resource blocks.

21. The method of any preceding embodiment, further comprising transmitting on the resource blocks on a condition of a positive sensing opportunity.

22. A method comprising communicating wirelessly via a licensed spectrum and a license exempt spectrum.

23. The method as in any of embodiments 1-21 and 22, further comprising monitoring a channel for a predetermined time before transmitting.

24. The method as in any of embodiments 1-21 and 22, further comprising transmitting if the channel is determined to be idle.

25. The method as in any of embodiments 1-21 and 22, further comprising enabling timing frequency synchronization.

26. The method as in any of embodiments 1-21 and 22, wherein initiating timing acquisition is achieved using a primary component carriers primary shared channel and secondary shared channel.

27. The method as in any of embodiments 1-21 and 22, further comprising using separate timing advance commands per component carrier.

28. The method as in any of embodiments 1-21 and 22, wherein a synchronous Hybrid automatic repeat request (HARQ) is defined where the downlink ACK/NACK response occurs at a fixed time in response to the uplink transmission.

29. The method as in any of embodiments 1-21 and 22, wherein a data indicator in the uplink scheduling grant of Physical Downlink Control Channel (PDCCH) notifies the wireless transmit/receive unit (WTRU) whether the transport block may be retransmitted.

30. The method as in any of embodiments 1-21 and 22, wherein parameters are changed for the retransmission.

31. The method as in any of embodiments 1-21 and 22, wherein the WTRU is configured with component carriers (CC) on the licensed spectrum.

32. The method as in any of embodiments 1-21 and 22, wherein cross-carrier scheduling is assumed for scheduling of the supplementary carrier.

33. The method as in any of embodiments 1-21 and 22, wherein a PDCCH on a component carrier may assign Physical Downlink Shared Channel (PDSCH) or Physical Uplink Shared Channel (PUSCH) resources in one of multiple component carriers using the carrier indicator field.

34. The method as in any of embodiments 1-21 and 22, wherein the Downlink control information (DCI) formats include 1-3 bit carrier indicator field (CIF).

35. The method as in any of embodiments 1-21 and 22, wherein configuration for the presence of CIF is WTRU specific.

36. The method as in any of embodiments 1-21 and 22, wherein a primary component carrier is used for time-critical control and feedback signaling.

37. The method as in any of embodiments 1-21 and 22, wherein a separate HARQ entity is associated with the supplementary carrier.

38. The method as in any of embodiments 1-21 and 22, wherein System Information (SI) is provided using dedicated signaling.

39. The method as in any of embodiments 1-21 and 22, wherein common reference signals are transmitted.

40. The method as in any of embodiments 1-21 and 22, further comprising receiving and buffering the supplementary carrier's PDSCH information before the PDCCH is completely decoded.

41. The method as in any of embodiments 1-21 and 22, wherein a uni-directional operation with license-exempt spectrum is used.

42. The method as in any of embodiments 1-21 and 22, further comprising communicating using 22 MHz channel blocks.

43. The method as in any of embodiments 1-21 and 22, further comprising supporting the following CC sizes—1.5 MHz, 2 MHz, 5 MHz, 10 MHz and 20 MHz.

44. The method as in any of embodiments 1-21 and 22, wherein bi-directional operation with license-exempt spectrum is used.

45. The method as in any of embodiments 1-21 and 22, wherein uplink and downlink are on different bands of the license-exempt spectrum.

46. The method as in any of embodiments 1-21 and 22, wherein the WTRU is configured with two component carriers (CCs).

47. The method as in any of embodiments 1-21 and 22, wherein measurement reports indicate that a WTRU is entering coverage of cell on supplementary carrier.

48. The method as in any of embodiments 1-21 and 22, wherein an event A3-LE is triggered and the supplementary carrier is added in the configured set.

49. The method as in any of embodiments 1-21 and 22, wherein the supplementary component carrier in the license exempt spectrum are used for the PDSCH.

50. The method as in any of embodiments 1-21 and 22, wherein synchronization information is derived separately by the ISM transceiver using a preamble.

51. The method as in any of embodiments 1-21 and 22, wherein timing and frequency synchronization are achieved using a frame preamble, periodic beacons, or using primary and secondary synchronization symbols.

52. The method as in any of embodiments 1-21 and 22, further comprising inserting preamble information at the start of the frame structure.

53. The method as in any of embodiments 1-21 and 22, further comprising sending periodic beacons instead or in addition to frame preamble.

54. The method as in any of embodiments 1-21 and 22, wherein resource blocks for beacons implemented as absolute blank sub-frames may mapped to the guard band adjacent to the supplementary component carrier.

55. The method as in any of embodiments 1-21 and 22, further comprising using primary and secondary synchronization symbols.

56. The method as in any of embodiments 1-21 and 22, wherein synchronization signals are transmitted periodically, twice per 10 ms radio frame.

57. The method as in any of embodiments 1-21 and 22, wherein uplink (UL) HARQ is synchronous.

58. The method as in any of embodiments 1-21 and 22, wherein the eNode B sends the WTRU a "soft-grant" for the supplementary carrier.

59. The method as in any of embodiments 1-21 and 22, further comprising sending resource availability and control information on the Physical Uplink Control Channel (PUCCH).

60. The method as in any of embodiments 1-21 and 22, wherein the WTRU is enabled with an autonomous grant mode, in which time the WTRU may be sensing the channel before every transmission time interval (TTI).

61. The method as in any of embodiments 1-21 and 22, further comprising sensing and transmitting frames only on allocated TTIs.

62. The method as in any of embodiments 1-21 and 22, wherein the eNode B semi-statically configures the group of WTRUs with a resource block usage grant.

63. The method as in any of embodiments 1-21 and 22, wherein an UL grant contains a deterministic back off value used to schedule access among WTRUs.

64. The method as in any of embodiments 1-21 and 22, further comprising adding channel estimation reference symbols to the suggested preamble.

65. The method as in any of embodiments 1-21 and 22, wherein the WTRU is configured with a short and long sensing period.

66. The method as in any of embodiments 1-21 and 22, wherein only the RLC unacknowledged mode traffic is sent on the component carriers using the license-exempt spectrum.

67. A wireless transmit/receive unit configured to implement the method as in any one of embodiments 1-66.

68. A base station configured to implement the method as in any one of embodiments 1-66.

69. A home Node-B (HNB) configured to implement the method as in any one of embodiments 1-66.

70. An evolved HNB configured to implement the method as in any one of embodiments 1-66.

Although features and elements are described above in particular combinations, one of ordinary skill in the art may appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
   utilizing, by the WTRU, carrier aggregation with an uplink primary component carrier in licensed spectrum and an uplink secondary component carrier in unlicensed spectrum;
   receiving, by the WTRU on a physical downlink control channel (PDCCH) signal on a downlink component carrier, a grant for physical uplink shared channel (PUSCH) transmission on the uplink secondary component carrier, wherein the grant includes a resource allocation for a subframe set;
   wherein the subframe set includes a first subframe resource and another subframe resource following the subframe resource; and
   sensing, by the WTRU during a sensing time prior to utilization of the subframe resource, that the unlicensed spectrum is available; and transmitting, based on the sensing, data on the subframe resource and the another subframe resource, wherein the data is transmitted on the another subframe resource without further sensing.

2. The method of claim 1, wherein at least one of timing and frequency synchronization for the uplink secondary component carrier utilizes at least one of a frame preamble, periodic beacons, or primary and secondary synchronization symbols.

3. A wireless transmit/receive unit (WTRU) comprising:
a processor, electrically coupled to a transceiver, configured to utilize carrier aggregation with an uplink primary component carrier in licensed spectrum and an uplink secondary component carrier in unlicensed spectrum;
the transceiver configured to receive, on a physical downlink control channel (PDCCH) signal on a downlink component carrier, a grant for physical uplink shared channel (PUSCH) transmission on the uplink secondary component carrier, wherein the grant includes a resource allocation for a subframe set;
wherein the subframe set includes a subframe resource and another subframe resource following the subframe resource; and
the processor configured to sense, during a sensing time prior to utilization of the subframe resource, that the unlicensed spectrum is available; and
the transceiver configured to transmit, based on the sense that the unlicensed spectrum is available, data on the subframe resource and the another subframe resource, wherein the data is transmitted on the another subframe resource without further sensing.

4. The method of claim 1, wherein the sensing time is prior to a start of a subframe with which the sensing time is associated or at a start of a subframe with which the sensing time is associated.

5. The WTRU of claim 3, wherein the sensing time is prior to a start of a subframe with which the sensing time is associated or at a start of a subframe with which the sensing time is associated.

6. The method of claim 1 further comprising transmitting on a PUSCH of the uplink primary component carrier without performing carrier sensing.

7. The WTRU of claim 3 further comprising the transceiver configured to transmit on a PUSCH of the uplink primary component carrier without performing carrier sensing.

* * * * *